(12) United States Patent
Safai et al.

(10) Patent No.: US 10,160,163 B2
(45) Date of Patent: Dec. 25, 2018

(54) HEATING SYSTEM FOR COMPOSITE REWORK OF AIRCRAFT

(71) Applicant: The Boeing Company, Chicago, IL (US)

(72) Inventors: Morteza Safai, Seattle, WA (US); Kimberly D. Meredith, Seattle, WA (US)

(73) Assignee: The Boeing Company, Chicago, IL (US)

( * ) Notice: Subject to any disclaimer, the term of this patent is extended or adjusted under 35 U.S.C. 154(b) by 500 days.

(21) Appl. No.: 14/736,148

(22) Filed: Jun. 10, 2015

(65) Prior Publication Data

US 2015/0273761 A1 Oct. 1, 2015

Related U.S. Application Data

(63) Continuation-in-part of application No. 13/207,738, filed on Aug. 11, 2011.

(51) Int. Cl.
| | |
|---|---|
| *B29C 65/00* | (2006.01) |
| *B23K 26/00* | (2014.01) |
| *B23K 26/03* | (2006.01) |
| *B29C 73/10* | (2006.01) |
| *B29C 73/34* | (2006.01) |
| *B23K 26/082* | (2014.01) |
| *B29L 31/30* | (2006.01) |
| *B29C 35/08* | (2006.01) |

(Continued)

(52) U.S. Cl.
CPC .... *B29C 66/91221* (2013.01); *B23K 26/0006* (2013.01); *B23K 26/0066* (2013.01); *B23K 26/032* (2013.01); *B23K 26/082* (2015.10); *B29C 66/91411* (2013.01); *B29C 73/10* (2013.01); *B29C 73/34* (2013.01); *B23K 2201/34* (2013.01); *B23K 2203/16* (2013.01); *B23K 2203/38* (2015.10); *B23K 2203/42* (2015.10); *B29C 2035/0838* (2013.01); *B29L 2031/3076* (2013.01)

(58) Field of Classification Search
CPC ......... B29C 66/91221; B29C 66/91411; B29C 73/10; B29C 73/34; B23K 26/082; B23K 26/0006; B23K 26/0066
USPC .......................................... 156/64
See application file for complete search history.

(56) References Cited

U.S. PATENT DOCUMENTS

| | | |
|---|---|---|
| 4,009,364 A | 2/1977 | Ladstadter |
| 4,743,733 A | 5/1988 | Mehta et al. |

(Continued)

FOREIGN PATENT DOCUMENTS

| | | |
|---|---|---|
| DE | 3903153 A1 | 8/1990 |
| DE | 19817629 A1 | 10/1999 |

(Continued)

OTHER PUBLICATIONS

Office Action, dated Oct. 4, 2012, regarding U.S. Appl. No. 13/207,738, 22 pages.

(Continued)

*Primary Examiner* — Michael N Orlando
*Assistant Examiner* — Elizabeth Bradford
(74) *Attorney, Agent, or Firm* — Yee & Associates, P.C.

(57) ABSTRACT

A machine and process for a heating system for a composite patch comprising a light beam and a controller. The controller is configured to command the light beam to heat the resin in the composite patch to a desired level for curing while avoiding overheating a fiber in the composite patch.

20 Claims, 16 Drawing Sheets

(51) Int. Cl.
  *B23K 101/34* (2006.01)
  *B23K 103/16* (2006.01)
  *B23K 103/00* (2006.01)

(56) References Cited

U.S. PATENT DOCUMENTS

| | | | |
|---|---|---|---|
| 4,874,948 | A | 10/1989 | Ceilo et al. |
| 4,944,817 | A | 7/1990 | Bourell et al. |
| 5,078,821 | A | 1/1992 | Garvey et al. |
| 5,519,486 | A | 5/1996 | Baird et al. |
| 5,811,055 | A | 9/1998 | Geiger |
| 5,968,382 | A | 10/1999 | Matsumoto et al. |
| 6,010,746 | A | 1/2000 | Descoteaux et al. |
| 6,129,489 | A | 10/2000 | Linderholm |
| 6,144,010 | A | 11/2000 | Tsumeni et al. |
| 6,149,749 | A | 11/2000 | McBroom |
| 6,174,392 | B1 | 1/2001 | Reis |
| 6,384,370 | B1 | 5/2002 | Tsunemi et al. |
| 7,424,902 | B2 | 9/2008 | Engelbart et al. |
| 7,509,735 | B2 | 3/2009 | Philip et al. |
| 7,664,153 | B2 | 2/2010 | Inenaga |
| 7,682,970 | B2 | 3/2010 | Grigoropoulos et al. |
| 8,396,187 | B2 | 3/2013 | Safai |
| 2005/0086916 | A1 | 4/2005 | Caron |
| 2005/0235493 | A1 | 10/2005 | Phillip et al. |
| 2006/0044555 | A1 | 3/2006 | Wang et al. |
| 2006/0048881 | A1 | 3/2006 | Evans et al. |
| 2006/0073309 | A1 | 4/2006 | Hogg |
| 2007/0096352 | A1 | 5/2007 | Cochran et al. |
| 2010/0035375 | A1 | 2/2010 | Grigoropoulos et al. |
| 2010/0112190 | A1 | 5/2010 | Drewett et al. |
| 2010/0243152 | A1 | 9/2010 | Helfrich et al. |
| 2011/0247751 | A1 | 10/2011 | Steyer et al. |
| 2012/0148026 | A1 | 6/2012 | Safai |
| 2013/0037198 | A1 | 2/2013 | Safai |

FOREIGN PATENT DOCUMENTS

| | | | |
|---|---|---|---|
| EP | 1535693 | A1 | 6/2005 |
| JP | 2003161797 | A | 6/2003 |

OTHER PUBLICATIONS

Final Office Action, dated Aug. 1, 2013, regarding U.S. Appl. No. 13/207,738, 14 pages.

Office Action, dated Jul. 2, 2014, regarding U.S. Appl. No. 13/207,738, 19 pages.

Final Office Action, dated Mar. 5, 2015, regarding U.S. Appl. No. 13/207,738, 15 pages.

Office Action, dated Jun. 10, 2016, regarding U.S. Appl. No. 13/207,738, 17 pages.

Final Office Action, dated Dec. 2, 2016, regarding U.S. Appl. No. 13/207,738, 17 pages.

Ep search report dated Oct. 1, 2013 regarding application 12179730. 2-1703/2556915, reference P55080EP/RGH, applicant The Boeing Company, 8 pages.

Brecher et al., "Laser-assisted thermoplastic tape laying", Lorenz Kunststofftechnik GmbH SMC & BMC Composite News, JEC Composites, retrieved Jun. 23, 2011, pp. 1-5 http://www.jeccomposites.com.

Zeng et al., "Laser Assisted Polymer Bonding Technology for Advanced MEMS Packaging", 2nd Electronics Systemintegration Technology Conference, Greenwich, UK, Sep. 1, 2008, pp. 1225-1230.

Office Action, dated Feb. 7, 2018, regarding U.S. Appl. No. 13/207,738, 16 pages.

Notice of Allowance, dated Jun. 29, 2018, regarding U.S. Appl. No. 13/207,738, 13 pages.

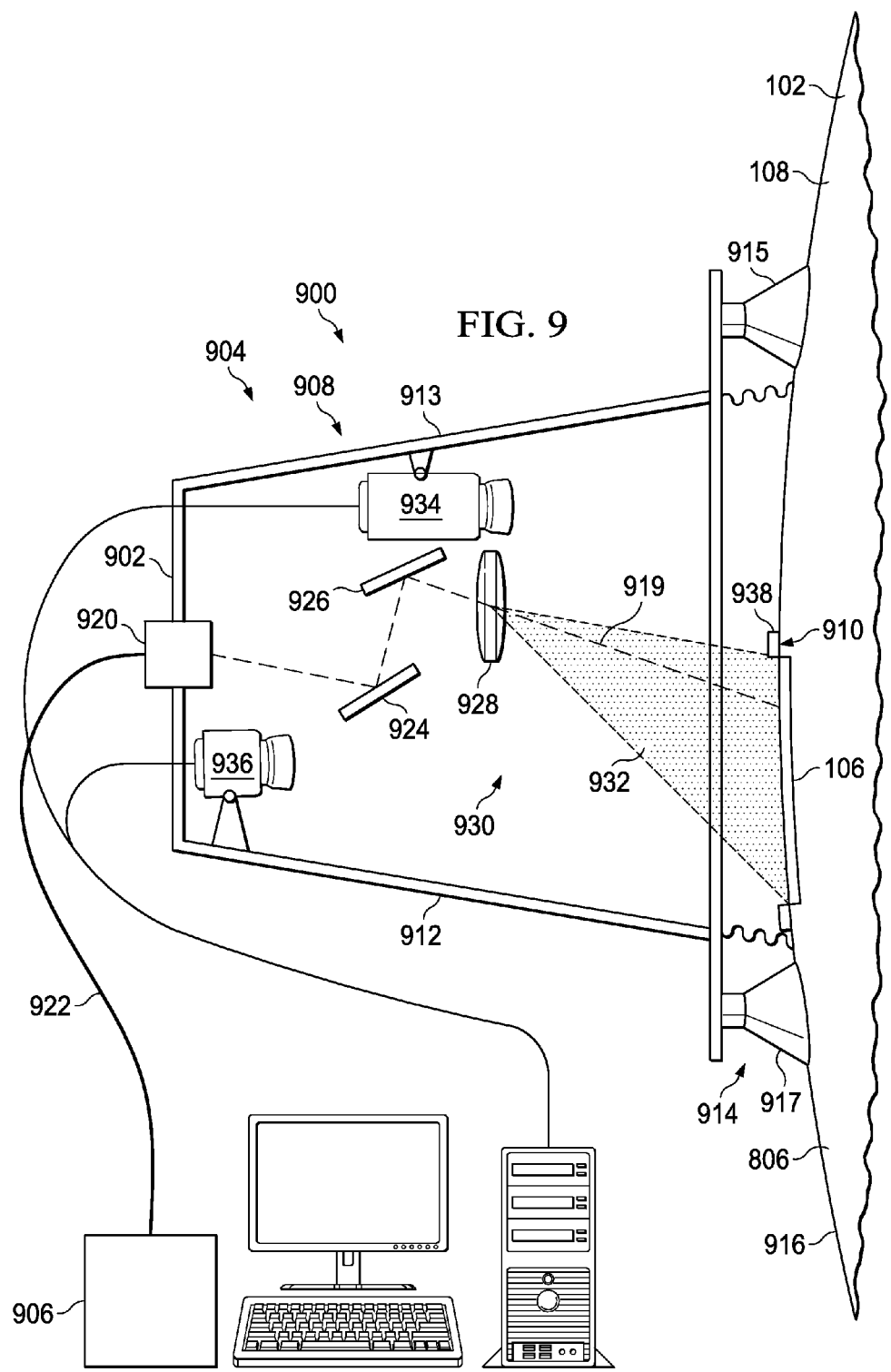

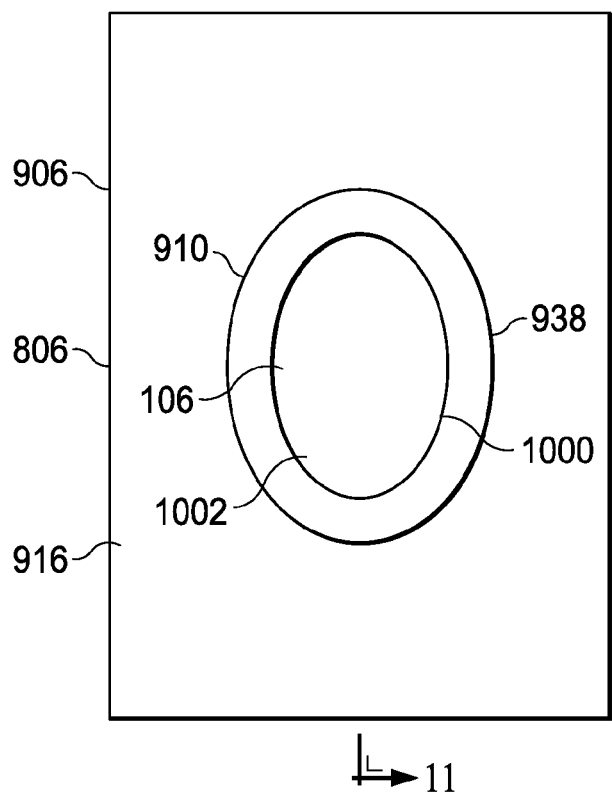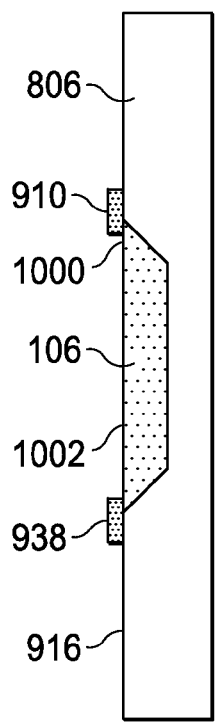

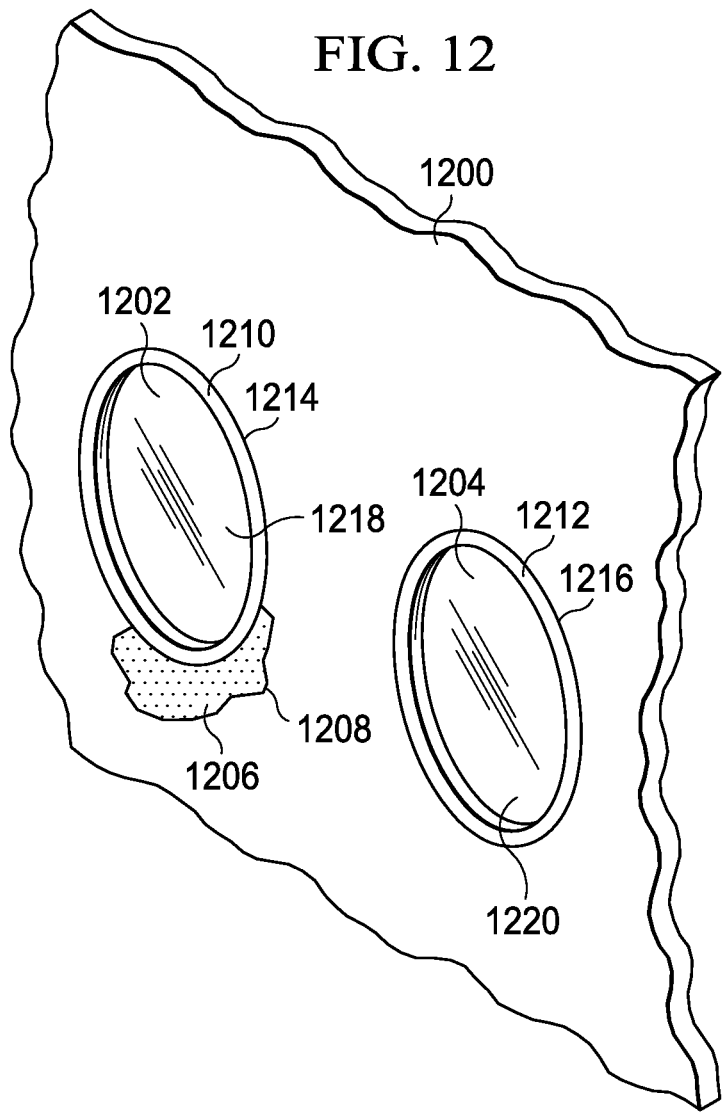

HEATING SYSTEM FOR COMPOSITE REWORK OF AIRCRAFT

CROSS-REFERENCE TO RELATED APPLICATION

This application is a continuation-in-part (CIP) of and claims priority to the following U.S. patent application Ser. No. 13/207,738, filed Aug. 11, 2011, and entitled "Heating System for Composite Rework of Aircraft," which is incorporated herein by reference.

BACKGROUND INFORMATION

1. Field

The present disclosure relates generally to aircraft and, in particular, to composite structures in aircraft. Still more particularly, the present disclosure relates to reworking composite structures in an aircraft.

2. Background

Aircraft are being designed and manufactured with greater and greater percentages of composite materials. Some aircraft may have more than 50 percent of their primary structure made from composite materials. Composite materials may reduce the weight of an aircraft. With the decreased weight, improved payload capacities and fuel efficiencies may occur. Further, composite materials may provide longer life for various components in the aircraft.

Composite materials are tough, lightweight materials and may include fibers and resins. The fibers and resins may be combined to form a cured composite material.

With composite materials, inconsistencies may occur during manufacturing or use of an aircraft. These inconsistencies may require rework. For example, a composite structure in the form of a skin panel may require rework. If an undesired inconsistency is present in the skin panel, a portion of the composite material containing the inconsistency may be removed from an area of the skin panel. The removal of the composite material involves removing layers of composite material from the skin panel where the undesired inconsistency is located. The removal of the layers removes the inconsistency.

After the layers of composite material are removed, a patch may be placed into the area. The patch is then cured to rework the skin panel. The patch often is comprised of layers of composite material similar to the layers in the area in which the composite material was removed from the skin panel.

In curing the patch, heat and vacuum are often applied to the patch. Currently, heating of the patch may involve using a heat blanket. The heat blanket is placed over the patch. Additionally, pressure may be applied by placing a bag over the heat blanket and applying a vacuum to the bag.

Challenges are present with heating composite structures. Uniform heating of the patch is desirable in curing these types of structures. The uniform heating may provide for a desired curing in the patch resulting in a desired level of performance for the patch. Current heating systems using heat blankets may not provide as uniform of a level of heating as desired.

Therefore, it would be advantageous to have a method and apparatus that takes into account at least some of the issues discussed above, as well as possibly other issues.

SUMMARY

In one advantageous embodiment, an apparatus comprises a laser unit and a controller. The laser unit is configured to generate a number of laser beams. The controller is configured to operate the laser unit to generate the number of laser beams resulting in a desired level of heating of a composite patch that cures the composite patch on a composite structure.

In another advantageous embodiment, a rework system for curing a composite patch in a location comprises a frame, a laser unit, a sensor system, and a controller. The frame is configured to be attached to the location. The laser unit is associated with the frame. The laser unit is configured to generate a laser beam. The sensor system is configured to generate temperature data about the composite patch. The controller is configured to operate the laser unit to generate the laser beam resulting in a desired level of heating of the composite patch that cures the composite patch on a composite structure.

In yet another advantageous embodiment, a method for curing a composite patch on a composite structure is provided. A rework system is attached to a location with the composite patch. The rework system comprises a laser unit configured to generate a number of laser beams and a controller configured to operate the laser unit. The rework system is operated to generate the number of laser beams resulting in a desired level of heating of a composite patch that cures the composite patch on the composite structure.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

FIG. 9 is an illustration of a rework system in accordance with an advantageous embodiment;

FIG. 10 is an illustration of a patch in a rework area with a mask system in accordance with an advantageous embodiment;

FIG. 11 is an illustration of a cross-sectional view of a rework area in accordance with an advantageous embodiment;

FIG. 12 is an illustration of an area in which a rework system may be used to cure a patch in accordance with an advantageous embodiment;

DETAILED DESCRIPTION

The different advantageous embodiments recognize and take into account one or more different considerations. For example, the different advantageous embodiments recognize and take into account that in addition to heat, a vacuum may be applied in an area in which a composite patch is applied for rework. The vacuum is applied to a bag covering the heat blanket. The bag with the vacuum applies pressure on the blanket to provide a more-uniform level of heating.

The different advantageous embodiments recognize and take into account that the configuration of the surface of the structure being reworked may not allow for uniform contact by a heat blanket. As a result, the heating of the composite patch may not be as uniform as desired.

For example, a heat blanket may provide more-uniform contact and more-uniform heating of a composite patch when the surface is substantially planar or has a curve rather than an angle.

When the surface is not substantially planar, the heating provided by the heat blanket may not be as uniform as desired. For example, windows, doorways, wing attachments, and other similar locations may be ones that have surfaces that are more difficult to apply uniform heating with heat blankets.

The different advantageous embodiments also recognize and take into account that even if uniform heating can be accomplished using current techniques, the current techniques may not be able to reduce heating of areas around the patch in a desirable fashion. For example, areas around the patch may include coatings, systems, or other components for which temperatures used to cure the patch may be undesirable. The temperatures achieved in curing a patch may result in a decreased performance or a need to rework those areas.

Thus, the different advantageous embodiments provide a method and apparatus for heating a composite material. In one advantageous embodiment, an apparatus comprises a laser unit and a controller. The laser unit is configured to generate a number of laser beams. The controller is configured to operate the laser unit to generate the number of laser beams resulting in a desired level of heating of a composite patch that cures the composite patch on the composite structure.

Figure 1:
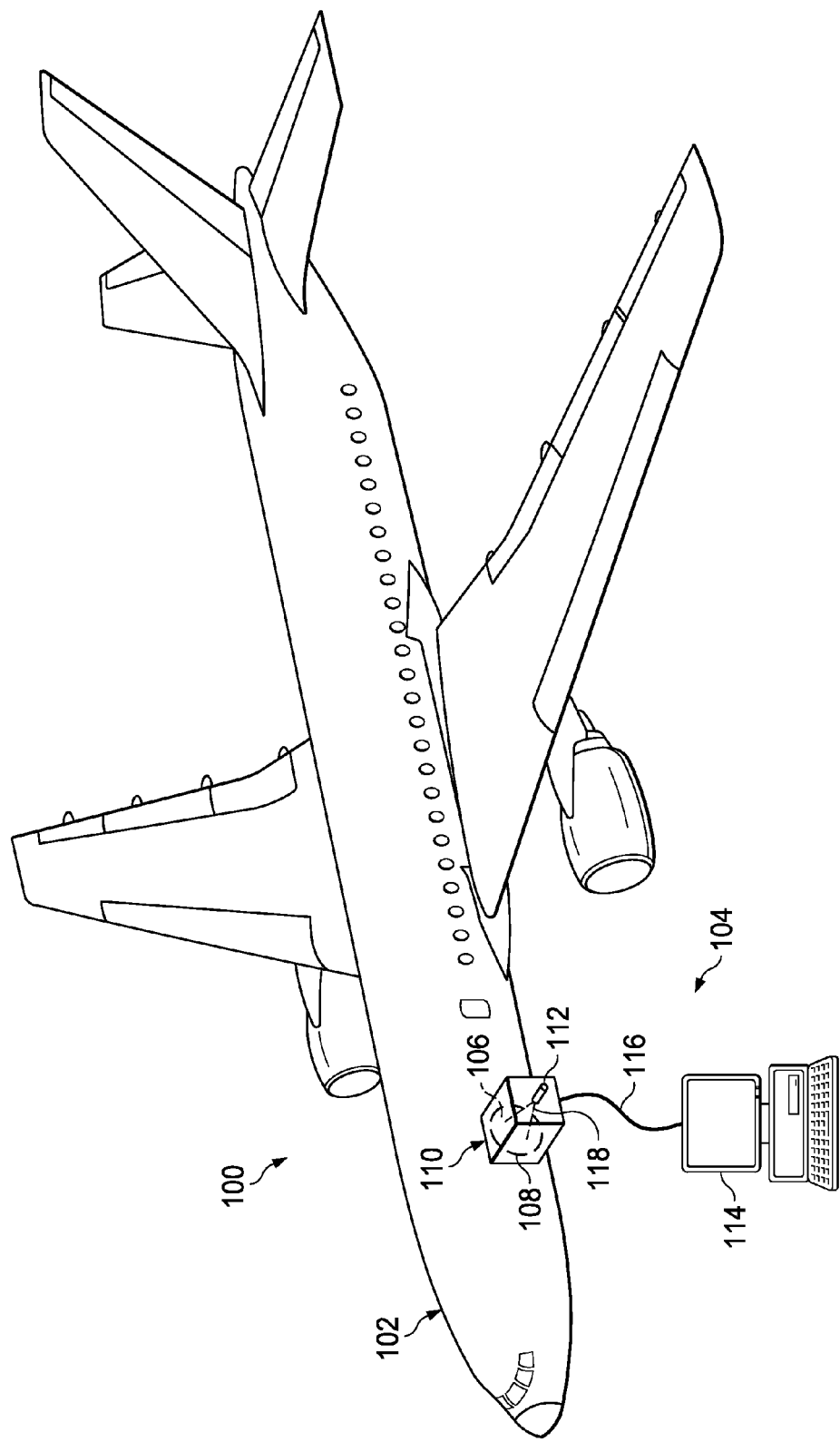
FIG. 1 is an illustration of a rework environment in accordance with an advantageous embodiment.

With reference now to FIG. 1, an illustration of a rework environment is depicted in accordance with an advantageous embodiment. In this illustrative example, rework environment 100 includes aircraft 102 and rework system 104. Rework system 104 is used to generate heat in composite patch 106 in location 108 on aircraft 102. The heat cures composite patch 106. In this illustrative example, composite patch 106 is shown in phantom.

Rework system 104 comprises frame 110, laser unit 112, and computer 114. Frame 110 covers composite patch 106 in this illustrative example. Frame 110 is configured to be connected to aircraft 102. In these illustrative examples, frame 110 is removably connected to aircraft 102 for purposes of performing rework at location 108.

Laser unit 112 is associated with frame 110. The association is a physical association in these depicted examples. A first component, such as laser unit 112, may be considered to be associated with a second component, such as frame 110, by being secured to the second component, bonded to the second component, mounted to the second component, welded to the second component, fastened to the second component, and/or connected to the second component in some other suitable manner. The first component also may be connected to the second component using a third component. The first component may also be considered to be associated with the second component by being formed as part of and/or an extension of the second component.

Computer 114 is connected to laser unit 112 through communications link 116. Communications link 116 takes the form of a cable in this illustrative example. Computer 114 is configured to send commands to laser unit 112 through communications link 116.

In this illustrative example, computer 114 controls the operation of laser unit 112 in these illustrative examples. Computer 114 controls laser unit 112 to generate laser beam 118.

In these illustrative examples, location 108 is a location of a composite structure in which rework of aircraft 102 is performed. In response to commands from computer 114, laser unit 112 moves laser beam 118 over composite patch 106.

The movement of laser beam 118 over composite patch 106 heats composite patch 106 to cure composite patch 106 in location 108. In these illustrative examples, laser beam 118 is generated by laser unit 112 in a manner that causes a desired level of heating in composite patch 106 to cure composite patch 106. The desired level of heating is configured to obtain a desired level of performance of composite patch 106 in location 108.

Figure 2:
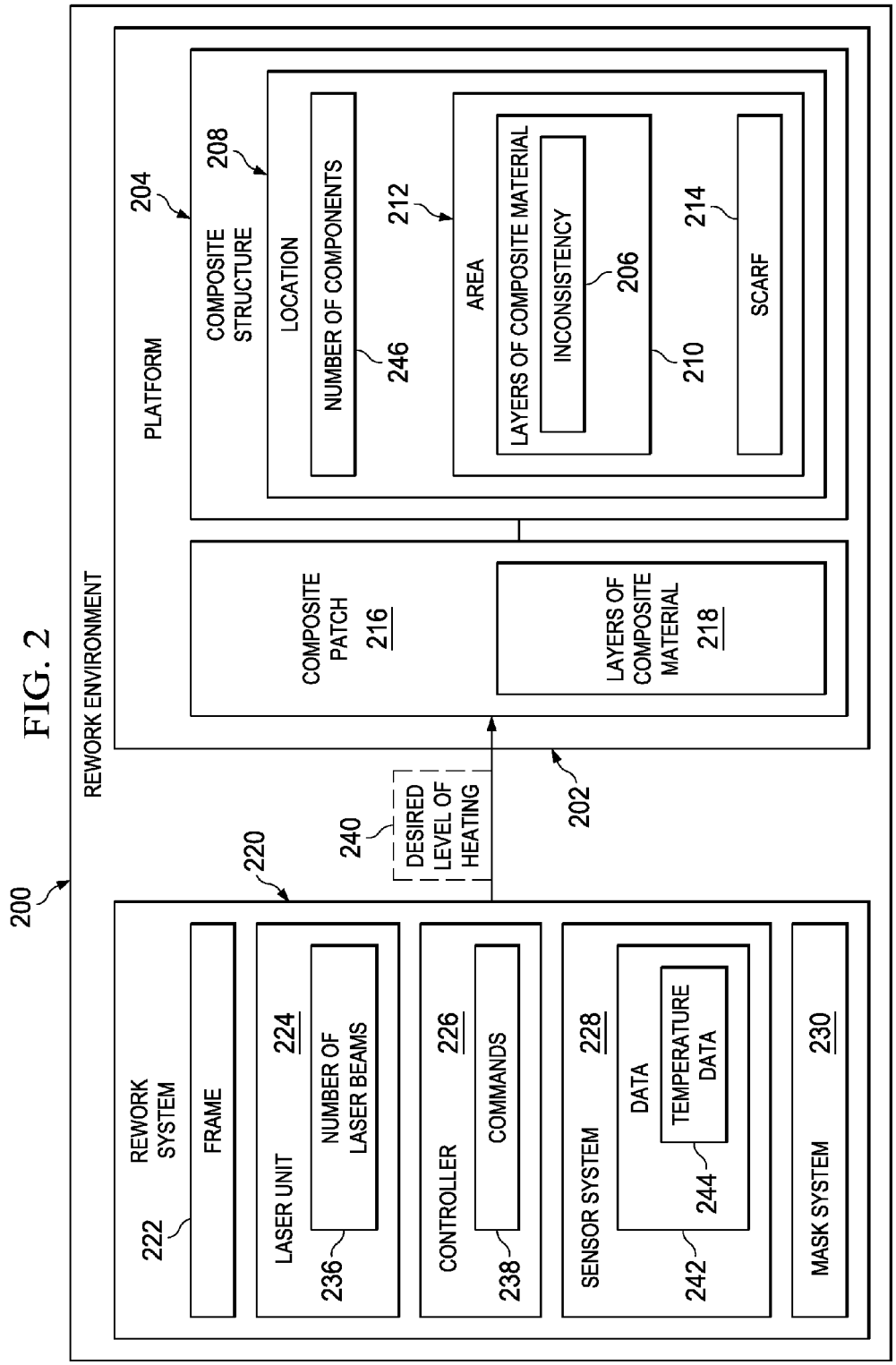
FIG. 2 is an illustration of a block diagram of a rework environment in accordance with an advantageous embodiment.

With reference now to FIG. 2, an illustration of a block diagram of a rework environment is depicted in accordance with an advantageous embodiment. Rework environment 100 in FIG. 1 is an example of one implementation for rework environment 200 in FIG. 2.

As illustrated, rework may be performed on composite structure 204 for platform 202. Rework may be performed when inconsistency 206 is present. As illustrated, inconsistency 206 is present in location 208 of composite structure 204 on platform 202.

In performing rework, layers of composite material 210 are removed from area 212 at location 208. In this depicted example, layers of composite material 210 include inconsistency 206. As a result, removing layers of composite material 210 also removes inconsistency 206.

The removal of layers of composite material 210 forms scarf 214 in area 212 at location 208. Scarf 214 is a volume which results from removing layers of composite material 210 in area 212.

Thereafter, composite patch 216 is placed into scarf 214 in area 212. Composite patch 216 may comprise layers of composite material 218 in an uncured form. Composite patch 216 may be a prepreg patch. As depicted, a prepreg patch is comprised of layers of fabric and resin infused into the layers of fabric in an uncured form. After composite patch 216 has been placed into scarf 214, rework system 220 cures composite patch 216.

In these illustrative examples, rework system 220 is configured to cure composite patch 216. As depicted, rework system 220 comprises frame 222, laser unit 224, controller 226, sensor system 228, and mask system 230.

Frame 222 may be hardware that is configured to be attached to platform 202 at location 208. Frame 222 provides a structure to which laser unit 224 may be associated. All or a portion of laser unit 224 may be supported by frame 222.

In the depicted example, laser unit 224 is hardware that is configured to generate number of laser beams 236. As used herein, "a number", when used with reference to items, means one or more items. For example, "number of laser beams 236" is one or more of number laser beams 236.

In these illustrative examples, controller 226 is hardware and controls the operation of laser unit 224. Controller 226 also may include software. Controller 226 generates commands 238. Commands 238 are received by laser unit 224 from controller 226 and cause laser unit 224 to generate number of laser beams 236. Number of laser beams 236 is generated in a manner resulting in desired level of heating 240 of composite patch 216.

This desired heating may occur in a manner that cures composite patch 216 in scarf 214 in area 212 at location 208. Desired level of heating 240 may be such that composite patch 216 when cured performs in a desired manner with composite structure 204. Desired level of heating 240 may be identified in a number of different ways. For example, desired level of heating 240 may be a particular temperature, a range of temperatures, an amount of resin flow, and/or other suitable types of parameters.

Sensor system 228 is hardware and is configured to generate data 242. Data 242 is data about area 212 in which the rework is performed in these illustrative examples. For example, without limitation, sensor system 228 is configured to detect the heating of composite patch 216. Sensor system 228 generates temperature data 244. For example, temperature data 244 may take the form of images, temperature values, and other suitable types of data, indicating the temperature and/or curing of composite patch 216.

Temperature data 244 is sent to controller 226 and may be used by controller 226 to obtain desired level of heating 240 for composite patch 216. The use of sensor system 228 with laser unit 224 and controller 226 provides a feedback system.

Mask system 230 is hardware that may cover number of components 246 in area 212. Number of components 246 may be one or more components for which heating may be undesirable. Mask system 230 is configured to reduce heating of number of components 246 by number of laser beams 236.

The illustration of rework environment 200 in FIG. 2 is not meant to imply physical or architectural limitations to the manner in which an advantageous embodiment may be implemented. Other components in addition to and/or in place of the ones illustrated may be used. Some components may be unnecessary. Also, the blocks are presented to illustrate some functional components. One or more of these blocks may be combined and/or divided into different blocks when implemented in an advantageous embodiment.

For example, in some configurations, rework system 220 may not include sensor system 228. In still other illustrative examples, controller 226 may be integrated as part of laser unit 224 rather than a separate component.

Figure 3:
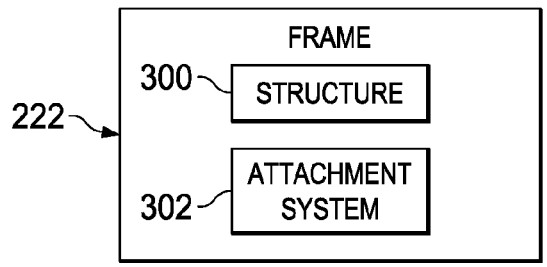
FIG. 3 is an illustration of a block diagram of a frame in accordance with an advantageous embodiment.

Turning next to FIG. 3, an illustration of a block diagram of a frame is depicted in accordance with an advantageous embodiment. In this illustrative example, frame 222 comprises structure 300 and attachment system 302. Structure 300 is the structure in frame 222 that is associated with laser unit 224 in FIG. 2. All or a portion of laser unit 224 may be connected to structure 300.

Structure 300 may take a number of different forms. For example, structure 300 may be a wire frame structure, a housing with opaque walls, and other suitable forms. When structure 300 takes the form of a housing, the housing may be a hood. The hood may reduce and/or prevent an operator from being exposed to a laser beam emitted from within the hood.

Attachment system 302 is the portion of frame 222 that is configured to attach frame 222 to platform 202 in FIG. 2. In this illustrative example, attachment system 302 may take a number of different forms. For example, without limitation, attachment system 302 may be comprised of at least one of a vacuum system, suction cups, adhesive, a fastener system, and other suitable types of components or devices that may connect frame 222 to platform 202.

As used herein, the phrase "at least one of", when used with a list of items, means different combinations of one or more of the listed items may be used and only one of each item in the list may be needed. For example, "at least one of item A, item B, and item C" may include, for example, without limitation, item A, or item A and item B. This example also may include item A, item B, and item C, or item B and item C.

Figure 4:
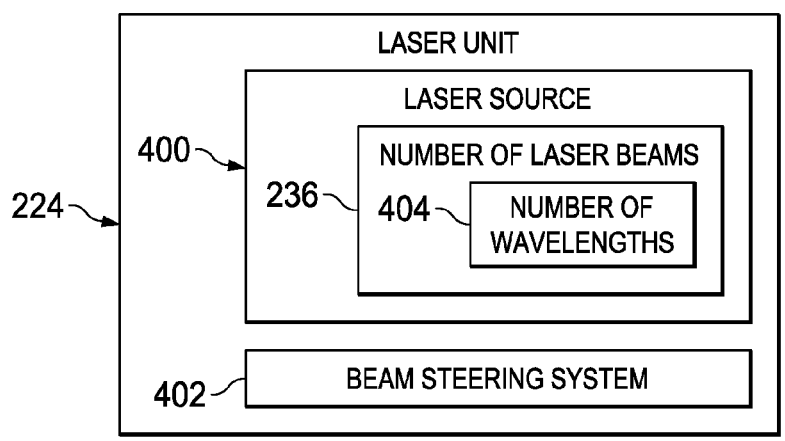
FIG. 4 is an illustration of a block diagram of a laser unit in accordance with advantageous embodiment.

With reference next to FIG. 4, an illustration of a block diagram of a laser unit is depicted in accordance with advantageous embodiment. As depicted, laser unit 224 comprises laser source 400 and beam steering system 402.

Laser source 400 may be any device configured to emit light through a process of optical amplification. Laser source 400 generates number of laser beams 236 in these illustrative examples. Number of laser beams 326 has number of wavelengths 404. The range of wavelengths 404 may be, for example, from about 1300 nanometers to about 300 nanometers. Of course other ranges or wavelengths may be used depending on the implementation.

In these illustrative examples, laser source 400 may take a number of different forms. For example, laser source 400 may be a gas laser, a chemical laser, an excimer laser, a light-emitting diode laser, a solid state laser, a fiber laser, a semiconductor laser, and other suitable types of sources for generating number of laser beams 236.

Beam steering system 402 is hardware configured to steer number of laser beams 236 in a desired direction. Beam steering system 402 may comprise components including at least one of mirrors, fiber-optic cables, lenses, and other suitable types of components that may be used to direct number of laser beams 236.

Figure 5:
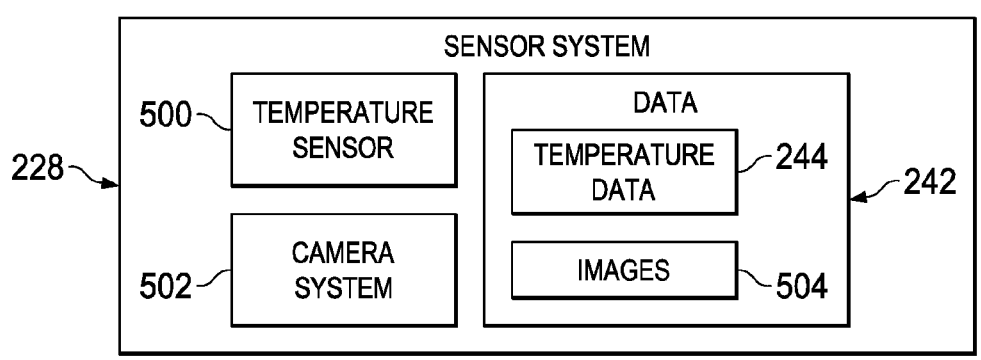
FIG. 5 is an illustration of a block diagram of a sensor system in accordance with an advantageous embodiment.

Turning now to FIG. 5, an illustration of a block diagram of a sensor system is depicted in accordance with an advantageous embodiment. In this illustrative example, sensor system 228 may be associated with frame 222 in FIG. 2. Sensor system 228 generates data 242 and comprises at least one of temperature sensor 500 and camera system 502.

Temperature sensor 500 may be selected from at least one of an infrared sensor, a non-contact thermometer, and other suitable types of sensors capable of generating temperature data 244 in data 242.

Camera system 502 also is configured to generate images 504. These images may be used as temperature data 244. In addition, images 504 may be used as types of data in data 242 other than temperature data 244.

For example, images 504 may be used to identify an area to which the laser beam is to be directed, the location of the laser beam, the amount of curing that has occurred, and/or other parameters regarding the rework being performed.

Figure 6:
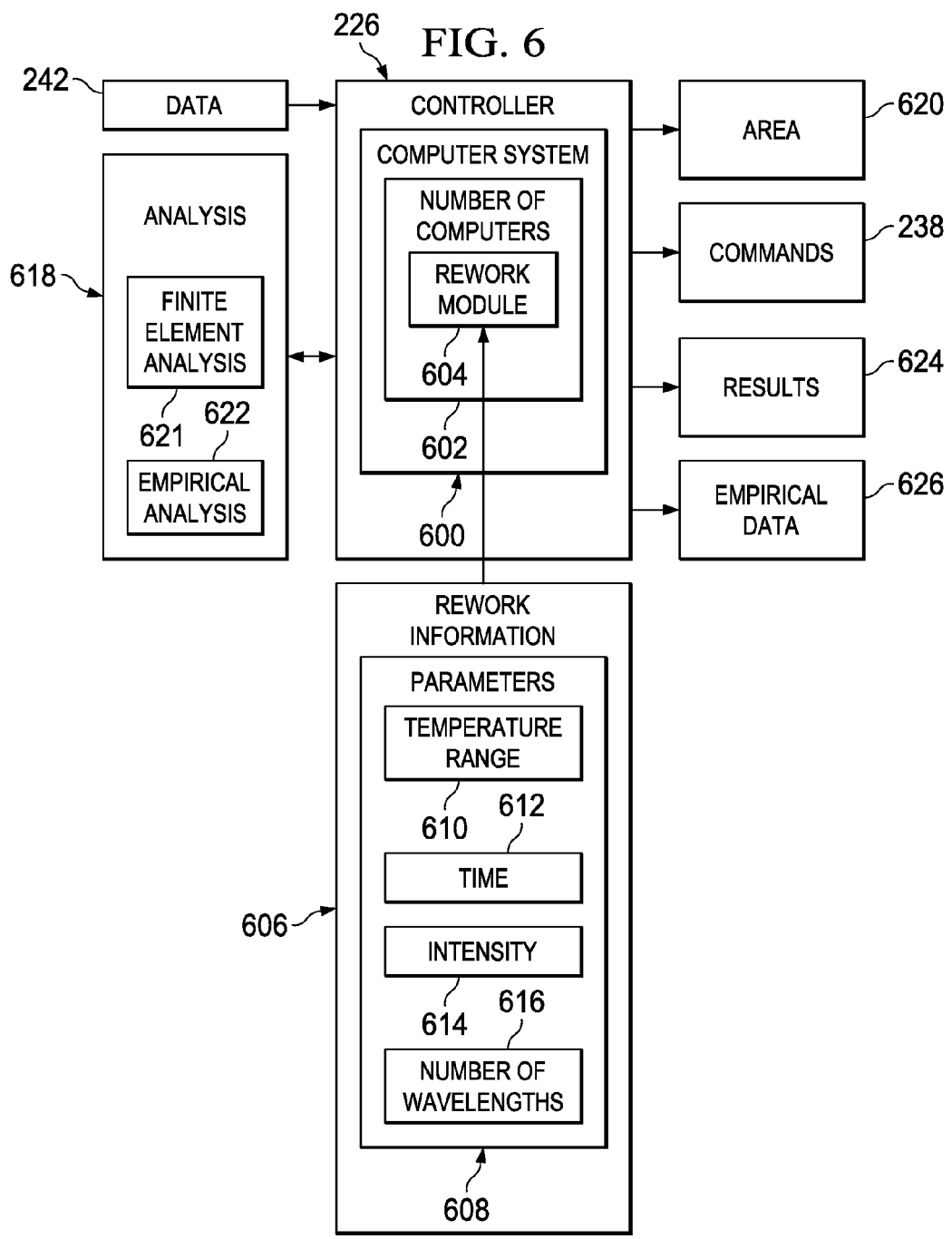
FIG. 6 is an illustration of a block diagram of a controller in accordance with an advantageous embodiment.

With reference now to FIG. 6, an illustration of a block diagram of a controller is depicted in accordance with an advantageous embodiment. In this illustrative example, controller 226 may comprise computer system 600. Computer system 600 may be formed from number of computers 602. When more than one computer is present in number of computers 602, those computers may be in communication with each other. This communication may be facilitated through a communication medium, such as, for example, a network.

In these illustrative examples, rework module 604 is located in computer system 600. Rework module 604 may be hardware, software, or a combination of the two.

Rework module 604 uses rework information 606 to generate commands 238 to operate laser unit 224 to cure composite patch 216 in FIG. 2. Rework module 604 receives rework information 606. Rework information 606 includes information about composite patch 216. Rework information 606 may take different forms. For example, rework information 606 may be stored in at least one of a database, a look-up table, a flat file, a configuration file, a program, and some other suitable form.

In these illustrative examples, rework information 606 may include parameters 608. Parameters 608 are used to generate commands 238 to operate laser unit 224 to generate number of laser beams 236 for curing composite patch 216 in FIG. 2. As depicted, parameters 608 include at least one of temperature range 610, time 612, intensity 614, number of wavelengths 616, and other suitable parameters.

Temperature range 610 indicates temperatures needed for desired level of heating 240 in FIG. 2. Intensity 614 defines an intensity for the laser beam for the particular patch. Number of wavelengths 616 identifies one or more wavelengths for the laser beam. In these illustrative examples, number of wavelengths 616 is selected to increase the absorption of light in the laser beam by the composite patch.

The one or more wavelengths may be selected such that temperature range 610 may be reached more easily, as compared to other wavelengths. In this manner, desired level of heating 240 may occur in the patch but not in other areas that may have different types of materials.

When sensor system 228 is present in rework system 220, controller 226 may receive data 242 from sensor system 228 in FIG. 2. Data 242 may be used to identify area 620. Area 620 is an area in which number of laser beams 236 should be directed to cure composite patch 216. Area 620 may be the same as area 212 in FIG. 2.

For example, images 504 in data 242 in FIG. 5 may be used to identify a boundary for composite patch 106 in FIG. 1. This boundary is used to identify area 620 in which number of laser beams 236 should be directed. In this manner, rework module 604 uses area 620 and rework information 606 to generate commands 238. Commands 238 are sent to laser unit 224 to perform the curing of composite patch 216.

Further, rework module 604 may receive data 242 while laser unit 224 is operating and generating number of laser beams 236. For example, rework module 604 may use images 504 in data 242 to determine whether number of laser beams 236 is within area 620. These images may be compared to the desired dimension for area 620, and the comparison may be used to direct the laser beam. Thus, with receiving images 504 during the curing of composite patch 216, rework module 604 may determine whether number of laser beams 236 is within the desired area to cure the composite patch.

Rework information 606 may be identified in a number of different ways. For example, rework information 606 may be identified using models of composite patch 216. Analysis 618 may be performed to identify heating within composite patch 216.

Analysis 618 may take different forms. For example, analysis 618 may be performed using a simulation, such as one provided through finite element analysis 621, empirical analysis 622, or some other simulation or modeling process.

When finite element analysis 621 is performed, results 624 are generated. Results 624 may be used to select values for parameters 608 that result in desired level of heating 240 of composite patch 216.

When empirical analysis 622 is performed, different permutations of parameters 608 may be tested using composite patch 216. The results of these tests are empirical data 626. Empirical data 626 may then be used to select values for parameters 608 that result in desired level of heating 240 of composite patch 216.

In still other illustrative examples, analysis 618 may involve both finite element analysis 621 and empirical analysis 622. Both results 624 and empirical data 626 may be used to generate rework information 606. In particular, this information may be used to select values for parameters 608.

With this type of analysis, identification for each step in a curing process may be made. For example, different temperatures, intensities, and wavelengths may be used at different times during the curing process, depending on the particular implementation and the results of performing finite element analysis 621 on the composite patch.

Rework module 604 also may perform analysis 618 to identify rework information 606, taking into account whether temperature of the patch should be cycled between different temperatures. For example, analysis 618 may be used to identify heating and cooling cycles for the composite patch.

In this manner, rework module 604 may be configured to operate laser unit 224 to generate number of laser beams 236, resulting in desired level of heating 240 of composite patch 216 that cures composite patch 216 on composite structure 204 based on temperature data 244 for the patch by the sensor and using rework information 606.

Of course, analysis 618 may include any other types of suitable modeling or simulation processes in addition to and/or in place of finite element analysis 621 and/or empirical analysis 622.

This analysis may take into account factors, such as vacuum bag transparency, optical absorption of the resin material, the depth and number of plies in the layers of composite material removed to form the scarf, vacuum bag pressure, structural boundary conditions, and/or other suitable factors. As a result, different portions of area 620 for composite patch 216 may use different temperatures, different wavelengths, and different intensities, depending on the particular implementation.

Further, rework module 604 may be configured to perform analysis accuracy checks on parameters 608 used to perform heating of composite patch 216. In these illustrative examples, temperature data 244 may be used by controller 226 to see if parameters 608 provide desired level of heating 240 for curing composite patch 216.

For example, parameters 608 may have values that have been selected from performing finite element analysis 621 for curing composite patch 216. The different values for parameters 608 may be used to determine whether desired level of heating 240 occurs in actual use to cure composite patch 216. This analysis accuracy check may be performed by using a number of parameters 608 and receiving data 242 from sensor system 228.

Figure 7:
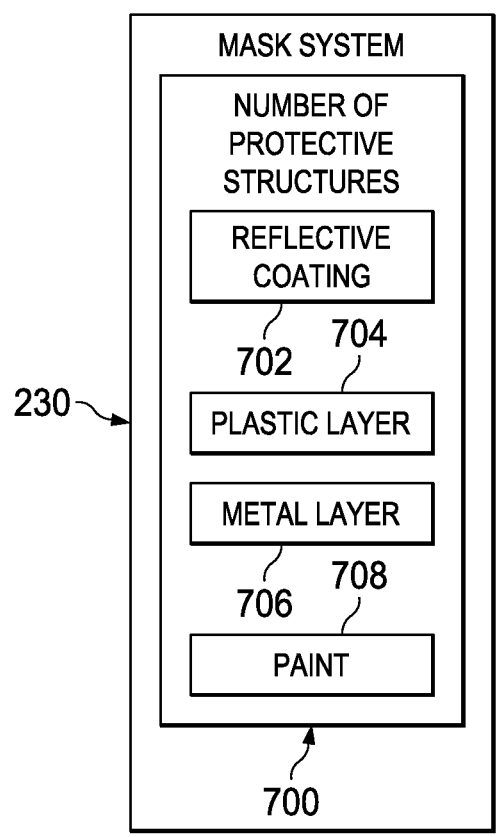
FIG. 7 is an illustration of a block diagram of a mask system in accordance with an advantageous embodiment.

With reference now to FIG. 7, an illustration of a block diagram of a mask system is depicted in accordance with an advantageous embodiment. In this illustrative example, mask system 230 is comprised of number of protective structures 700. Number of protective structures 700 is configured to cover number of components 246 in FIG. 2.

Number of protective structures 700 in mask system 230 may protect number of components 246 from exposure to number of laser beams 236. In other words, number of protective structures 700 may provide shielding or masking for these components.

Number of protective structures 700 may be placed in locations where heating for curing composite patch 216 in FIG. 2 is not needed. Number of protective structures 700 may comprise, for example, without limitation, reflective coating 702, plastic layer 704, metal layer 706, paint 708, and other suitable types of structures.

Thus, in these illustrative examples, number of protective structures 700 prevent the laser beam from heating areas in which number of components 246 is located.

The illustration of different components for rework system 220 in FIG. 2 in block form in FIGS. 3-7 are not meant to imply limitations to the manner in which different advantageous embodiments may be implemented. Other components may be used in addition to and/or in place of the ones illustrated in FIGS. 3-7. For example, a laser beam in number of laser beams 236 may be a different wavelength or wavelengths from other laser beams in number of laser beams 236. As another illustrative example, sensor system 228 in FIG. 5 may not always include camera system 502.

Figure 8:
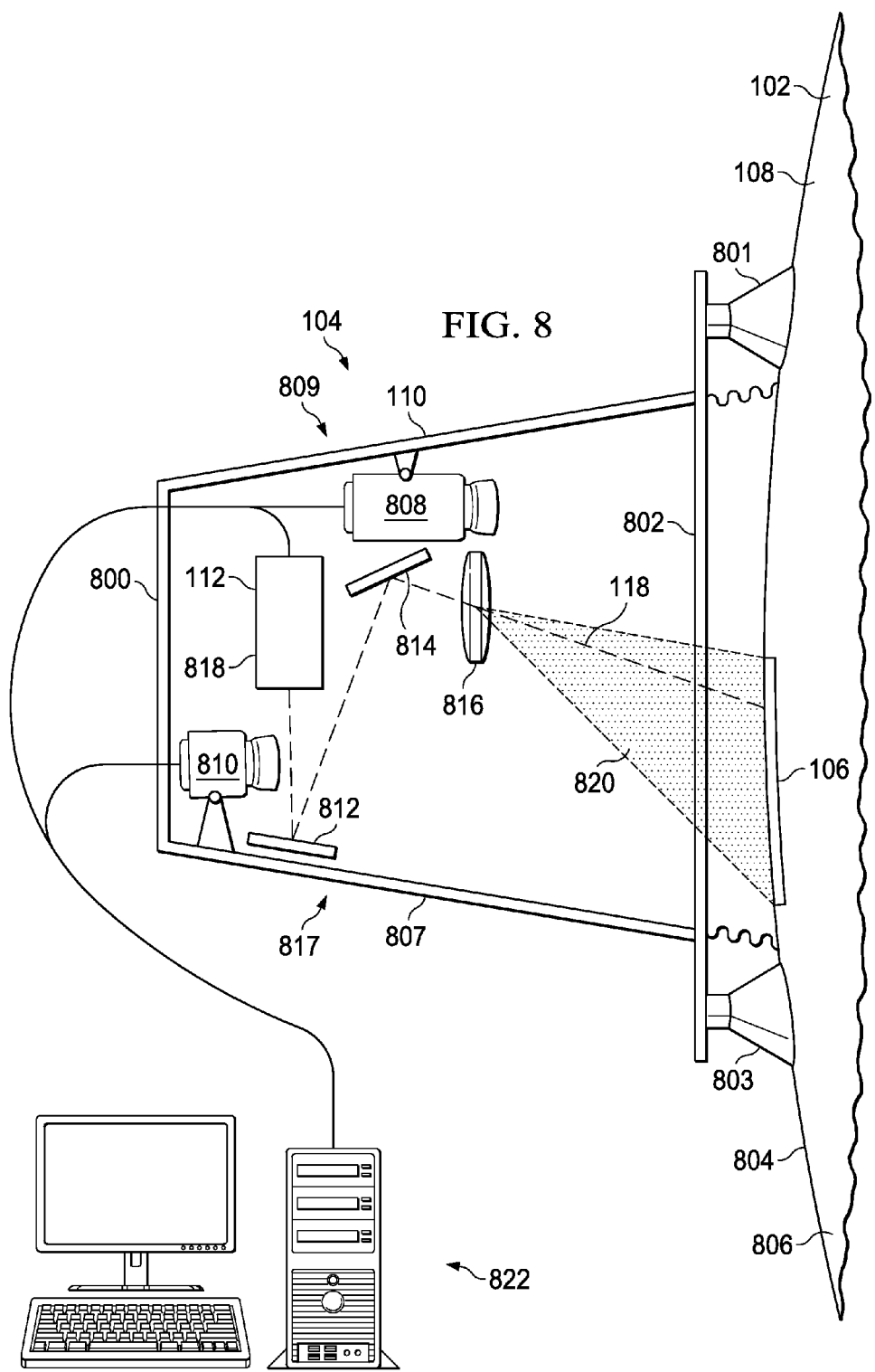
FIG. 8 is an illustration of a rework system in accordance with an advantageous embodiment.

With reference now to FIG. 8, an illustration of a rework system is depicted in accordance with an advantageous embodiment. In this illustrative example, a more-detailed depiction of rework system 104 in rework environment 100 is illustrated. In this illustrative example, frame 110 of rework system 104 has structure 800 and attachment system 802. Attachment system 802, in this illustrative example, comprises suction cups, such as suction cups 801 and 803, which are configured to attach frame 110 to surface 804 of composite structure 806 for aircraft 102.

Structure 800, in this illustrative example, is in the form of hood 807. Hood 807 is configured to reduce the chance that an operator may come into contact with laser beam 118 generated by laser unit 112 in this illustrative example. In other words, when structure 800 in frame 110 takes the form of hood 807, frame 110 reduces the exposure of an operator to laser beam 118.

In this illustrative example, sensor system 809 in rework system 104 comprises infrared camera 808 and visible camera 810.

Mirror 812, mirror 814, and scanning lens 816 are part of beam steering system 817 for laser source 818 in laser unit 112.

Scanning lens 816 is a lens that may change the direction of laser beam 118. In this illustrative example, scanning lens 816 may cause laser beam 118 to move in volume 820. Infrared camera 808, visible camera 810, laser source 818, and scanning lens 816 are controlled by controller 822.

Scanning lens 816 is a lens that may be controlled by a motor or actuator to direct laser beam 118 to move within volume 820 over composite patch 106. This movement also may be referred to as scanning. The type of scanning may be a raster type scanning.

With reference now to FIG. 9, an illustration of a rework system is depicted in accordance with an advantageous embodiment. In this illustrative example, rework system 900 is another example of a physical implementation for rework system 220 shown in block form in FIG. 2. Rework system 900 is an example of a rework system that may be used in place of rework system 104 to cure composite patch 106 at location 108 in FIG. 1.

As depicted, rework system 900 is attached to aircraft 102 at location 108. Rework system 900 is used to cure composite patch 106 in this illustrative example.

In this illustrative example, rework system 900 comprises frame 902, laser unit 904, controller 906, sensor system 908, and mask system 910.

Frame 902 comprises structure 912 and attachment system 914. Structure 912 takes the form of hood 913 in these illustrative examples. Attachment system 914 comprises suction cups, such as suction cups 915 and 917, which attach frame 902 to surface 916 of composite structure 806 of aircraft 102 in this illustrative example.

Laser unit 904 is associated with frame 902. In this illustrative example, only a portion of laser unit 904 is connected to frame 902. As depicted, laser source 907 is not supported by frame 902. Laser source 907 generates laser beam 919 and sends laser beam 919 to output 920 over fiber-optic cable 922. Output 920 is connected to frame 902 in these illustrative examples. In this manner, frame 902 may be configured to support less weight and may be itself lighter in weight and smaller when laser source 907 is not supported by frame 902.

In these illustrative examples, mirror 924, mirror 926, and scanning lens 928 form beam steering system 930 for laser unit 904. Laser beam 919 is steered using beam steering system 930 to move within volume 932 in this illustrative example.

As depicted, infrared camera 934 and physical camera 936 form sensor system 908 for rework system 900. These cameras generate images and/or other data that may be used to control laser unit 904 to cure composite patch 106 in a desired manner.

In this illustrative example, mask system 910 comprises protective structure 938, which is placed over portions of composite structure 806 in which heating is undesired. In this manner, if laser beam 919 strays from volume 932, other portions of composite structure 806 may remain unheated or heating may be reduced in a manner that does not change the performance of composite structure 806 in an undesired manner.

With reference now to FIG. 10, an illustration of a patch in a rework area with a mask system is depicted in accordance with an advantageous embodiment. In this illustrative example, protective structure 938 for mask system 910 is placed on surface 916 of composite structure 806.

Protective structure 938 is placed around edge 1000 of composite patch 106. Protective structure 938 has an area that is configured to reduce the effects of a laser beam that may stray from area 1002 in which composite patch 106 is located. In this manner, composite structure 806 may not become heated during curing of composite patch 106 if the laser beam moves out of area 1002. In these illustrative examples, protective structure 938 for mask system 910 is comprised of a reflective coating. This reflective coating is configured to reflect a laser beam that may be directed onto protective structure 938 outside of area 1002 for composite patch 106.

In this manner, undesired heating of composite structure 806 or other components under composite structure 806 may be avoided.

Turning to FIG. 11, an illustration of a cross-sectional view of a rework area is depicted in accordance with an advantageous embodiment. In this illustrative example, a cross-sectional view of composite structure 806 is seen as taken along lines 11-11 in FIG. 10.

With reference now to FIG. 12, an illustration of an area in which a rework system may be used to cure a patch is depicted in accordance with an advantageous embodiment. In this illustrative example, an illustration of fuselage 1200 for an aircraft is depicted. As depicted, fuselage 1200 includes window 1202 and window 1204. Composite patch 1206 is located in area 1208.

In this illustrative example, window 1202 has frame 1210, and window 1204 has frame 1212. Frame 1210 may have coating 1214, and frame 1212 may have coating 1216. These coatings may be a protective and/or decorative coating. Further, window 1202 may have coating 1218, and window 1204 may have coating 1220.

In curing composite patch 1206, a laser beam heating any of coating 1214, coating 1216, coating 1218, and coating 1220 is undesirable. Heating of one or more of these coatings may result in an undesired change in the performance of these coatings and may require additional rework after curing of composite patch 1206.

With rework system 220 in FIG. 2, heating of composite patch 1206 in area 1208 without heating coating 1214, coating 1216, coating 1218, and/or coating 1220 may occur. As discussed above, rework system 220 may selectively direct a laser beam to only heat composite patch 1206 within area 1208. Further, the wavelength or wavelengths selected for the laser beam may be such that light from the laser beam is absorbed by the material in composite patch 1206 but is not absorbed by aluminum coating 1214. Further, the different advantageous embodiments also may cover one or more of coating 1214, coating 1216, coating 1218, and coating 1220 with a mask system as an additional tool for reducing heating of coating 1214, coating 1216, coating 1218, and coating 1220.

In this manner, one or more of the different advantageous embodiments may provide an ability to cure composite patch 1206 in a desired manner while reducing the effects of the curing process on other portions of fuselage 1200.

The illustration of rework system 104 in FIG. 1 and FIG. 8, and the illustration of rework system 900 in FIGS. 9-12 are examples of implementations of rework system 220 shown in block form in FIG. 2. These illustrations are not meant to imply limitations to the manner in which other rework systems may be physically implemented.

For example, other rework systems may generate more than one laser beam. In still other illustrative examples, other rework systems may have more than one laser unit or more than one laser source. In still other illustrative examples, other rework systems may not include both an infrared camera and a visible light camera. In still other illustrative examples, cameras may be omitted. Other types of sensors may be used or a sensor system may not be necessary, depending on the particular implementation.

Figure 13:
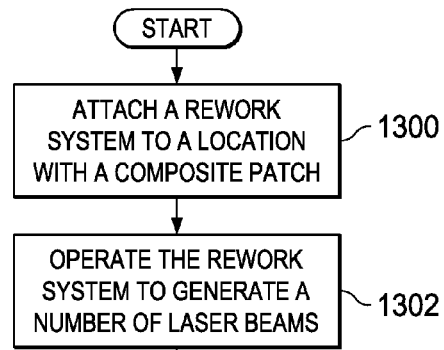
FIG. 13 is an illustration of a flowchart of a process for curing a composite patch in accordance with an advantageous embodiment.

Turning now to FIG. 13, an illustration of a flowchart of a process for curing a composite patch is depicted in accordance with an advantageous embodiment. The process illustrated in FIG. 13 may be implemented using rework system 220 in FIG. 2.

The process begins by attaching a rework system to a location with a composite patch (operation 1300). In this example, the rework system may comprise a laser unit and a controller. Of course, the rework system also may include other components, depending on the particular implementation.

The process then operates the rework system to generate a number of laser beams (operation 1302), with the process terminating thereafter. The number of laser beams is generated to result in a desired level of heating of a composite patch that cures the composite patch on the composite structure. In these illustrative examples, this desired level of heating is one that results in the composite patch having a desired level of performance once the composite patch is cured.

Figure 14:
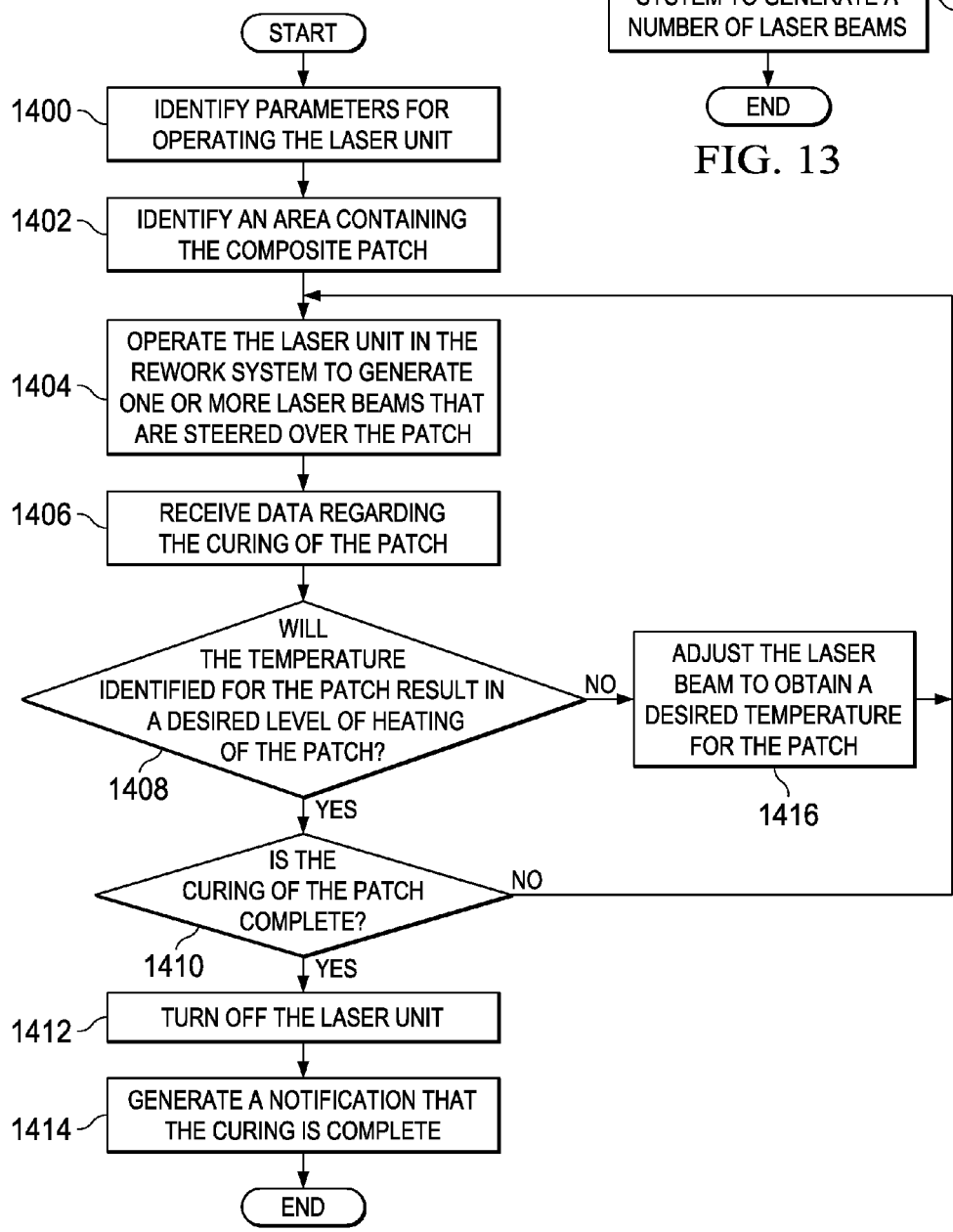
FIG. 14 is an illustration of a flowchart of a process for operating a rework system in accordance with an advantageous embodiment.

With reference now to FIG. 14, an illustration of a flowchart of a process for operating a rework system is depicted in accordance with an advantageous embodiment. The process illustrated in FIG. 14 is an example of operations that may be performed for operation 1302 in FIG. 13.

The process begins by identifying parameters for operating the laser unit (operation 1400). These parameters may be part of rework information 606 in FIG. 6. The parameters may include, for example, a wavelength for the laser beam, an intensity, and/or other suitable information for curing the composite patch in a desired manner.

The process then identifies an area containing the composite patch (operation 1402). This area may be identified using a sensor system in the rework system. This sensor system may be, for example, without limitation, a visible light camera, an infrared camera, or some other suitable type of sensor. The sensor system is used to identify the edges of where the rework should be performed. This sensor system may, for example, identify the area in which the patch is located.

The process then operates the laser unit in the rework system to generate one or more laser beams that are steered over the patch (operation 1404). This laser beam is generated and steered based on the parameters identified for curing the patch. The process receives data regarding the curing of the patch (operation 1406). This data includes temperature data that may be obtained as values from a sensor system or identified from images generated by the sensor system.

A determination is made as to whether the temperature identified for the patch will result in a desired level of heating of the patch (operation 1408). In this determination, the temperatures may be identified for different portions of a patch. Some portions of a patch may have a different desired temperature than other portions, depending on the configuration of the patch. In this illustrative example, a uniform temperature is desired to be present in the patch. This determination may be made in a number of different ways. For example, at least one of a finite element analysis, empirical data, or a look-up table may be used to determine whether the temperature identified for the patch will provide a desired level of heating.

If the temperature results in a desired level of heating of the patch, a determination is made as to whether the curing of the patch is complete (operation 1410). If the curing is complete, the process turns off the laser unit (operation 1412). A notification is generated that the curing is complete (operation 1414), and the process terminates thereafter.

With reference again to operation 1410, if the curing of the patch is not complete, the process returns to operation 1404 as discussed above.

With reference again to operation 1408, if the temperature does not result in a desired level of heating of the patch, the process adjusts the laser beam to obtain a desired temperature for the patch (operation 1416). The process then proceeds to operation 1404 as described above.

Figure 15:
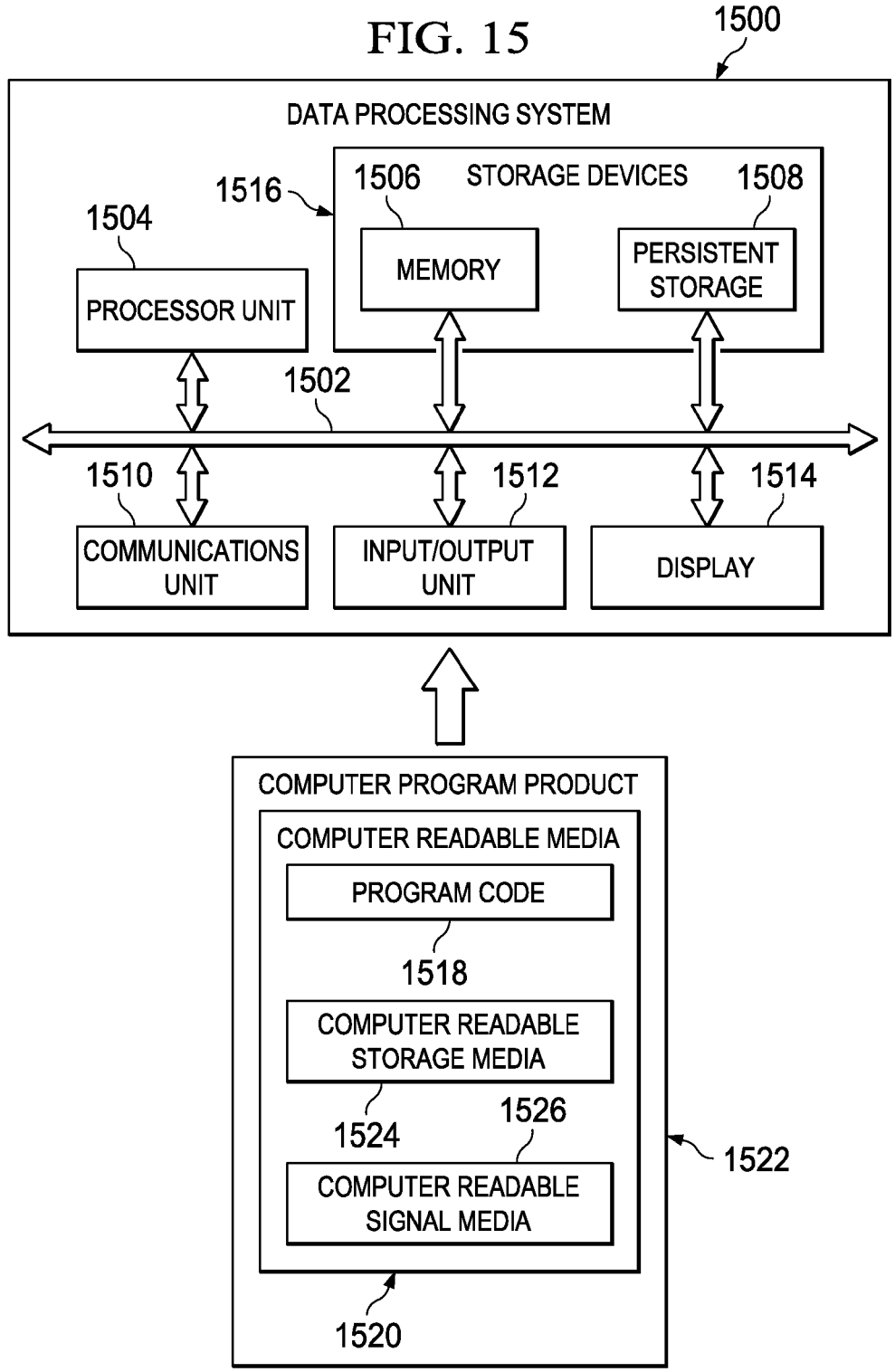
FIG. 15 is an illustration of a data processing system in accordance with an advantageous embodiment.

Turning now to FIG. 15, an illustration of a data processing system is depicted in accordance with an advantageous embodiment. Data processing system 1500 may be used to implement one or more computers in number of computers 602 in computer system 600 in FIG. 6. In this illustrative example, data processing system 1500 includes communications framework 1502, which provides communications between processor unit 1504, memory 1506, persistent storage 1508, communications unit 1510, input/output (I/O) unit 1512, and display 1514.

Processor unit 1504 serves to execute instructions for software that may be loaded into memory 1506. Processor unit 1504 may be a number of processors, a multi-processor core, or some other type of processor, depending on the particular implementation. A number, as used herein with reference to an item, means one or more items. Further, processor unit 1504 may be implemented using a number of heterogeneous processor systems in which a main processor is present with secondary processors on a single chip. As another illustrative example, processor unit 1504 may be a symmetric multi-processor system containing multiple processors of the same type.

Memory 1506 and persistent storage 1508 are examples of storage devices 1516. A storage device is any piece of hardware that is capable of storing information, such as, for example, without limitation, data, program code in functional form, and/or other suitable information either on a temporary basis and/or a permanent basis. Storage devices 1516 may also be referred to as computer readable storage devices in these examples. Memory 1506, in these examples, may be, for example, a random access memory or any other suitable volatile or non-volatile storage device. Persistent storage 1508 may take various forms, depending on the particular implementation.

For example, persistent storage 1508 may contain one or more components or devices. For example, persistent storage 1508 may be a hard drive, a flash memory, a rewritable optical disk, a rewritable magnetic tape, or some combination of the above. The media used by persistent storage 1508 also may be removable. For example, a removable hard drive may be used for persistent storage 1508.

Communications unit 1510, in these examples, provides for communications with other data processing systems or devices. In these examples, communications unit 1510 is a network interface card. Communications unit 1510 may provide communications through the use of either or both physical and wireless communications links.

Input/output unit 1512 allows for input and output of data with other devices that may be connected to data processing system 1500. For example, input/output unit 1512 may provide a connection for user input through a keyboard, a mouse, and/or some other suitable input device. Further, input/output unit 1512 may send output to a printer. Display 1514 provides a mechanism to display information to a user.

Instructions for the operating system, applications, and/or programs may be located in storage devices 1516, which are in communication with processor unit 1504 through communications framework 1502. In these illustrative examples, the instructions are in a functional form on persistent storage 1508. These instructions may be loaded into memory 1506 for execution by processor unit 1504. The processes of the different embodiments may be performed by processor unit 1504 using computer-implemented instructions, which may be located in a memory, such as memory 1506.

These instructions are referred to as program code, computer usable program code, or computer readable program code that may be read and executed by a processor in processor unit 1504. The program code in the different embodiments may be embodied on different physical or computer readable storage media, such as memory 1506 or persistent storage 1508.

Program code 1518 is located in a functional form on computer readable media 1520 that is selectively removable and may be loaded onto or transferred to data processing system 1500 for execution by processor unit 1504. Program code 1518 and computer readable media 1520 form computer program product 1522 in these examples. In one example, computer readable media 1520 may be computer readable storage media 1524 or computer readable signal media 1526.

Computer readable storage media 1524 may include, for example, an optical or magnetic disk that is inserted or placed into a drive or other device that is part of persistent storage 1508 for transfer onto a storage device, such as a hard drive, that is part of persistent storage 1508. Computer readable storage media 1524 also may take the form of a persistent storage, such as a hard drive, a thumb drive, or a flash memory, that is connected to data processing system 1500. In some instances, computer readable storage media 1524 may not be removable from data processing system 1500.

In these examples, computer readable storage media 1524 is a physical or tangible storage device used to store program code 1518 rather than a medium that propagates or transmits program code 1518. Computer readable storage media 1524 is also referred to as a computer readable tangible storage device or a computer readable physical storage device. In other words, computer readable storage media 1524 is a media that can be touched by a person.

Alternatively, program code 1518 may be transferred to data processing system 1500 using computer readable signal media 1526. Computer readable signal media 1526 may be, for example, a propagated data signal containing program code 1518. For example, computer readable signal media 1526 may be an electromagnetic signal, an optical signal, and/or any other suitable type of signal. These signals may be transmitted over communications links, such as wireless communications links, optical fiber cable, coaxial cable, a wire, and/or any other suitable type of communications link.

In other words, the communications link and/or the connection may be physical or wireless in the illustrative examples.

In some advantageous embodiments, program code 1518 may be downloaded over a network to persistent storage 1508 from another device or data processing system through computer readable signal media 1526 for use within data processing system 1500. For instance, program code stored in a computer readable storage medium in a server data processing system may be downloaded over a network from the server to data processing system 1500. The data processing system providing program code 1518 may be a server computer, a client computer, or some other device capable of storing and transmitting program code 1518.

The different components illustrated for data processing system 1500 are not meant to provide architectural limitations to the manner in which different embodiments may be implemented. The different advantageous embodiments may be implemented in a data processing system including components in addition to or in place of those illustrated for data processing system 1500. Other components shown in FIG. 15 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 1504 may take the form of a hardware unit that has circuits that are manufactured or configured for a particular use. This type of hardware may perform operations without needing program code to be loaded into a memory from a storage device to be configured to perform the operations.

For example, when processor unit 1504 takes the form of a hardware unit, processor unit 1504 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 1518 may be omitted, because the processes for the different embodiments are implemented in a hardware unit.

In still another illustrative example, processor unit 1504 may be implemented using a combination of processors found in computers and hardware units. Processor unit 1504 may have a number of hardware units and a number of processors that are configured to run program code 1518. With this depicted example, some of the processes may be implemented in the number of hardware units, while other processes may be implemented in the number of processors.

In another example, a bus system may be used to implement communications framework 1502 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of devices that transmit data, receive data, or transmit and receive data. A communications unit may be, for example, a modem or a network adapter, two network adapters, or some combination thereof. Further, a memory may be, for example, memory 1506, or a cache, such as found in an interface and memory controller hub that may be present in communications framework 1502.

Figure 16:
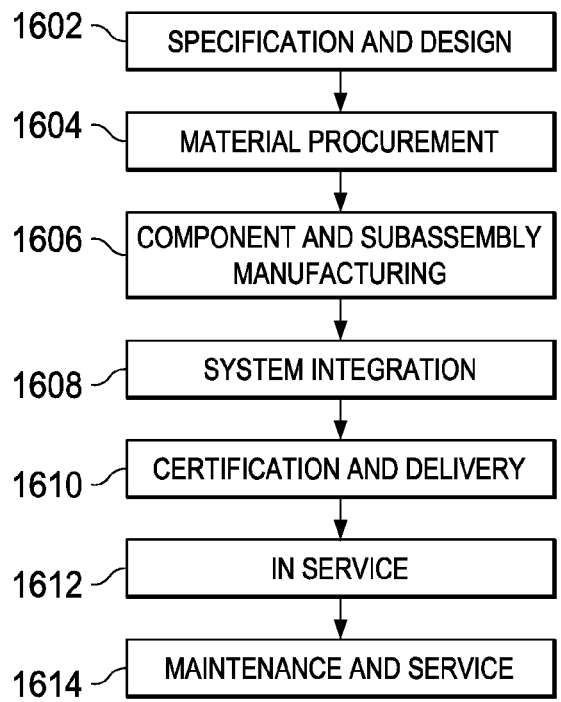
FIG. 16 is an illustration of an aircraft manufacturing and service method in accordance with an advantageous embodiment.
Figure 17:
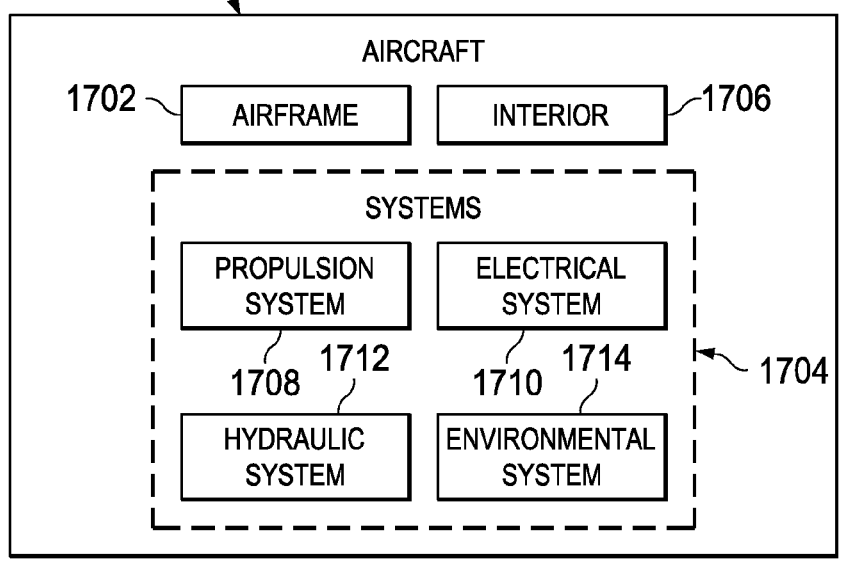
FIG. 17 is an illustration of an aircraft in which an advantageous embodiment may be implemented.

Advantageous embodiments of the disclosure may be described in the context of aircraft manufacturing and service method 1600 as shown in FIG. 16 and aircraft 1700 as shown in FIG. 17. Turning first to FIG. 16, an illustration of an aircraft manufacturing and service method is depicted in accordance with an advantageous embodiment. During pre-production, aircraft manufacturing and service method 1600 may include specification and design 1602 of aircraft 1700 in FIG. 17 and material procurement 1604.

During production, component and subassembly manufacturing 1606 and system integration 1608 of aircraft 1700 in FIG. 17 takes place. Thereafter, aircraft 1700 in FIG. 17 may go through certification and delivery 1610 in order to be placed in service 1612. While in service 1612 by a customer, aircraft 1700 in FIG. 17 is scheduled for routine maintenance and service 1614, which may include modification, reconfiguration, refurbishment, and other maintenance or service.

Each of the processes of aircraft manufacturing and service method 1600 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 17, an illustration of an aircraft is depicted in which an advantageous embodiment may be implemented. In this example, aircraft 1700 is produced by aircraft manufacturing and service method 1600 in FIG. 16 and may include airframe 1702 with plurality of systems 1704 and interior 1706. Examples of systems 1704 include one or more of propulsion system 1708, electrical system 1710, hydraulic system 1712, and environmental system 1714. Any number of other systems may be included. Although an aerospace example is shown, different advantageous embodiments may be applied to other industries, such as the automotive industry.

Apparatuses and methods embodied herein may be employed during at least one of the stages of aircraft manufacturing and service method 1600 in FIG. 16.

In one illustrative example, components or subassemblies produced in component and subassembly manufacturing 1606 in FIG. 16 may be fabricated or manufactured in a manner similar to components or subassemblies produced while aircraft 1700 is in service 1612 in FIG. 16. As yet another example, one or more apparatus embodiments, method embodiments, or a combination thereof may be utilized during production stages, such as component and subassembly manufacturing 1606 and system integration 1608 in FIG. 16. One or more apparatus embodiments, method embodiments, or a combination thereof may be utilized while aircraft 1700 is in service 1612 and/or during maintenance and service 1614 in FIG. 16. The use of a number of the different advantageous embodiments may substantially expedite the assembly of and/or reduce the cost of aircraft 1700.

In particular, one or more advantageous embodiments may be used to perform rework on different components of aircraft 1700 during one or more different phases of aircraft manufacturing and service method 1600. In particular, rework system 220 in FIG. 2 may be used to perform rework on aircraft 1700 during component and subassembly manufacturing 1606, maintenance and service 1614, and other phases of aircraft manufacturing and service method 1600.

Hence illustrative embodiments above describe at least an apparatus including: a frame; an attachment system configured such that in operation, the attachment system may attach the frame to a surface of a composite structure; a laser unit may directly connect to the frame and configured such that the laser unit comprises a laser source and, in operation, the laser unit may generate a number of laser beams; and a controller may be configured to identify a wavelength, and intensity required for each laser beam in the number of laser beams generated by the laser unit and cause a desired level of heating of a composite patch for each step needed to cure the composite patch on the surface of the composite structure, such that the number of laser beams may cause the desired level of heating of the composite patch.

The composite structure may be a component of an aircraft. The inconsistency of the component of the aircraft may be repaired responsive to the heating of the composite patch.

The frame of the apparatus may also include a structure that may support a portion of the laser unit, and the attachment system may include suction cups that attach the frame to the surface of the composite structure in which the composite patch is placed on the composite structure. The frame may also include a hood configured such that in operation the hood may reduce exposure directed toward an operator from the number of laser beams during operation of the laser unit to cure the composite patch.

The apparatus may also include: a sensor system attached to the frame, the sensor system configured such that in operation, the sensor system may detect heating of the composite patch on the composite structure and generates temperature data for the composite patch; and the controller configured to operate the laser unit to generate the number of laser beams and cause the desired level of heating of the composite patch to cure the composite patch on the surface of the composite structure, based on the temperature data for the composite patch generated by the sensor system.

The temperature data may be selected from at least one of images and temperature values. The sensor may be configured to identify, from the images, a location of the laser beam, an amount of curing that has occurred for the composite patch, and an area to which the laser beam is to be directed.

The laser unit may be configured to generate a laser beam that may include a wavelength between 300 and 1300 nanometers in the number of laser beams as directed by the controller and cause the desired level of heating of the composite patch for each step needed to cure the composite patch on the surface of the composite structure. The controller may be configured to select the wavelength to increase an absorption of light, in the number of laser beams, by the composite patch but not in adjacent areas comprised of materials different from materials that comprise the composite patch. The laser unit may also be configured to generate the number of laser beams to cause the desired level of heating of the composite patch.

The controller may be configured to identify an intensity and duration for the number of laser beams that may be required to heat a location of the composite patch based on factors associated with the heating of the composite patch. The factors may include at least one of: an optical absorption of a resin in the composite patch, a transparency of a vacuum bag covering the composite patch, and a pressure in the vacuum bag.

Additionally, the controller may be configured to identify movements, for the number of laser beams over a surface of the composite patch, using a beam steering system, in a manner to cause the desired level of heating of the composite patch. The beam steering system may include at least one of mirrors, fiber-optic cables, and lenses. The movements may be based upon a simulation analysis that may account for a group of factors that include: a transparency of a vacuum bag that covers the composite patch, an optical absorption of a resin material in the composite patch, a depth and a number of plies layers of composite material removed to form a scarf that may receive the composite patch, and a pressure in the vacuum bag.

The apparatus may also include a mask system, wherein the mask system may reduce heating by the number of laser beams in a section covered by the mask system. The mask system may include a number of protective structures that may prevent the number of laser beams from heating a section covered by the number of protective structures.

The apparatus may also include a camera system attached to the frame. The camera system may be configured to generate information about the composite patch, such that in operation the controller may identify an area that a laser beam may be directed using the information about the composite patch generated by the camera system.

The illustrative embodiments above may also describe a rework system that may cure composite patches on surfaces of composite structures. The rework system may include: a frame attached to a surface of a composite structure via an attachment system; a laser unit attached to the frame. The laser unit may include a laser source, and may be configured such that in operation the laser unit may generate a laser beam.

A sensor system may be attached to the frame. The sensor system may generate temperature data about the composite patch. The composite patch may include layers of fabric and resin in an uncured form on the surface of the composite structure.

The rework system may include a controller that may be configured to command the laser unit to generate the laser beam and cure the composite patch on the surface of the composite structure via heating a portion of the composite patch to a desired level as needed at each step in a curing process, such that the command identifies a wavelength and an intensity for the laser beam that may cause a desired level of heating of the portion of the composite patch. The laser beam may be a first laser beam and the laser unit may generate a second laser beam and the controller may be configured to control the laser unit, such that in operation, the laser unit may generate the first laser beam and the second laser beam and cause the desired level of heating of the composite patch to cure the composite patch inside a vacuum bag on the surface of the composite structure.

The rework system may also include a mask system. The mask system may reduce heating by the laser beam in a section covered by the mask system.

The controller in the rework system may be configured to conduct an analysis using at least one of: a simulation process, a finite analysis; and an empirical analysis, that may use a least one factor from a group of factors that may include: a transparency of a vacuum bag that may cover the composite patch, an optical absorption of a resin material in the composite patch, a depth and a number of plies layers of composite material removed to form a scarf that may receive the composite patch, and a pressure in the vacuum bag.

The composite patch of the rework system on the surface of the composite structure may be located in a scarf in the composite structure. The scarf may result from a removal of layers of composite material from an area of the composite structure. The desired level of heating for the composite patch may be one or more of: a particular temperature, a range of temperatures, and an amount of resin flow.

Thus, the illustrative embodiments for a method and apparatus of a heating system for a rework area described above and below recognize and take into consideration that a resin and a fiber in a composite ply may have different values for allowable energy absorption. One of ordinary skill in the art will recognize that it may be desirable for a precisely controlled beam of light, such as, without limitation a laser beam, to heat a resin that contains a fiber, without the laser energy directly contacting the fiber in the resin. Laser energy may be absorbed by a composite patch via the laser light being absorbed by the resin in the composite patch.

Illustrative embodiments herein recognize and take into account that existing solutions to curing composite patches use a heat blanket. Current use of heat blankets make control of heating difficult and imprecise. Existing systems and methods do not provide accurate heating controls for non-homogeneous and/or irregular geometric areas, and/or varied components within a composite layer, such as without limitation fibers inside of resin, which may, without limitation, be in a composite patch. The existing solutions do not provide precise controlled temperatures for each section of a composite layer, and do not target specific areas in a composite patch for adding a precise amount of light energy, or control curing based on fiber orientation, thickness for curing. Thus, currently used methods increase thermally induced stresses and thermally induced deformation on the rework, components of a patch applied as part of the rework, and/or the surrounding parent areas. Increasing thermally induced stresses and thermally induced deformation on the repair and/or the surrounding parent areas can degrade structural integrity of a composite patch and/or a composite structure receiving the composite patch. Without limitation, degradations may include ply microcracking, delamination between plies, and/or failure of the composite patch and/or composite structure attributed to composite fracture due to thermally induced defects.

Hence, a controller, such as without limitation controller 822, as shown at least in FIG. 8, may know or be provided data 242 and rework information 606 about a composition and a characteristic of each layer of a composite patch, such as without limitation composite patch 106, as shown at least in FIG. 6 and in FIG. 8. Controller 822 may know the exact location and composition of each individual fiber in each layer of composite material that makes up a composite patch and/or a composite structure, such as without limitation composite patch 216 and/or composite structure 204 as shown at least in FIG. 2.

As such, controller 822 may know a quantity, a wavelength, and an intensity, or a combination thereof that each fiber in each layer of composite material in composite patch 216 of FIG. 2 can absorb before the fiber may be overheated, and/or damaged in a way that reduces a desired quality of the fiber and/or the layer of the composite patch 216 and/or composite structure 204 containing the fiber. A desired quality for a fiber and/or a composite layer containing the fiber may include a characteristic for carrying or transferring a stress and/or a load.

Each fiber may reveal a damaged and/or potentially damaged, and/or imminently damaged condition via a thermal or a visual indication. Without limitation a change in a temperature, a color, a profile, a stiffness, and/or a shape of a fiber may indicate a damaged and/or potentially damaged, and/or imminently damaged condition via a thermal or a visual indication. Without limitation, a fiber may indicate a damaged and/or potentially damaged, and/or imminently damaged condition via a scorched and/or burnt appearance, and/or a temperature that exceeds a designated value.

Likewise, controller 822 may know or be provided data about an existing and a desired characteristic for a resin composition of each layer of composite patch 216, and/or for resin in a particular section of a layer of composite patch 216 of FIG. 2. Without limitation, an existing characteristic of a resin section may include an energy and/or a heat absorption rate and/or limit, and/or heat transfer rate and/or capability, as influenced by various types of an energy and/or heat application. Without limitation the energy and/or heat application may include a selected wavelength, intensity, duration, and/or combinations thereof, of a laser beam.

Without limitation controller 822 may know a desired temperature to cure a selected section of resin at a desired rate of curing to achieve a desired characteristic for the resin and the layer of composite patch 216 that contains the resin, and/or of the composite patch 216. Without limitation, the desired characteristic for the resin and the layer of composite patch 216 that contains the resin may include a desired percent of cure for each section of resin in a layer in composite patch 216, and/or a desired stiffness, and/or a desired conductivity, and/or a desired color, and/or a desired amount of transparency. Composite patch 216 may include different types of resin in each layer, and/or in different sections within any given layer in composite patch 216. Without limitation, controller 822 may know a heat transfer rate for every section of resin within each layer of composite patch 216.

The illustrative embodiments recognize and take into account, that when energy is applied to a composite layer, if the energy is primarily received by a fiber and/or fibers in the composite layer, that it may be possible for the fiber to receive enough energy such that the fiber may be damaged to reduce a desired characteristic of the fiber, while the resin may not receive enough energy to cure, or to cure at a desired rate.

Therefore, controller 822 may select a desired duration and precise location for directing application of a specific energy to the surface of composite patch 216, such that fibers within composite patch 216 are not overheated and/or damaged, and resin within a section within each layer of composite patch is heated to a desired temperature for curing each layer of composite patch 216 at a desire rate to a desired percentage of cure.

A particular amount of energy applied to composite patch 216 may create desired level of heating 240 in composite patch 216, as shown at least in FIG. 2. Composite patch 216 may be an illustrative embodiment of composite patch 106, as shown at least in FIG. 1 and FIG. 8. The particular amount of energy applied to composite patch 106 may create desired level of heating 240 which may be generated by laser source 818 as shown at least in FIG. 8. Laser source 818 may emit a laser wavelength and/or intensity, and/or a selected combination thereof, for a duration specified by controller 822.

Precise direction of a laser beam, such as without limitation laser beam 118 as shown at least in FIG. 8, may be guided by scanning lens 816. Scanning lens 816 may direct location and travel of laser beam 118. Thus, illustrative embodiments above and below may show examples of a method and apparatus for a heating system for a composite patch that controls an energy applied to cure a composite patch located abutting a composite layer in a scarf in a composite structure, and/or on a surface of the composite structure over an inconsistency of the composite structure.

Figure 18:
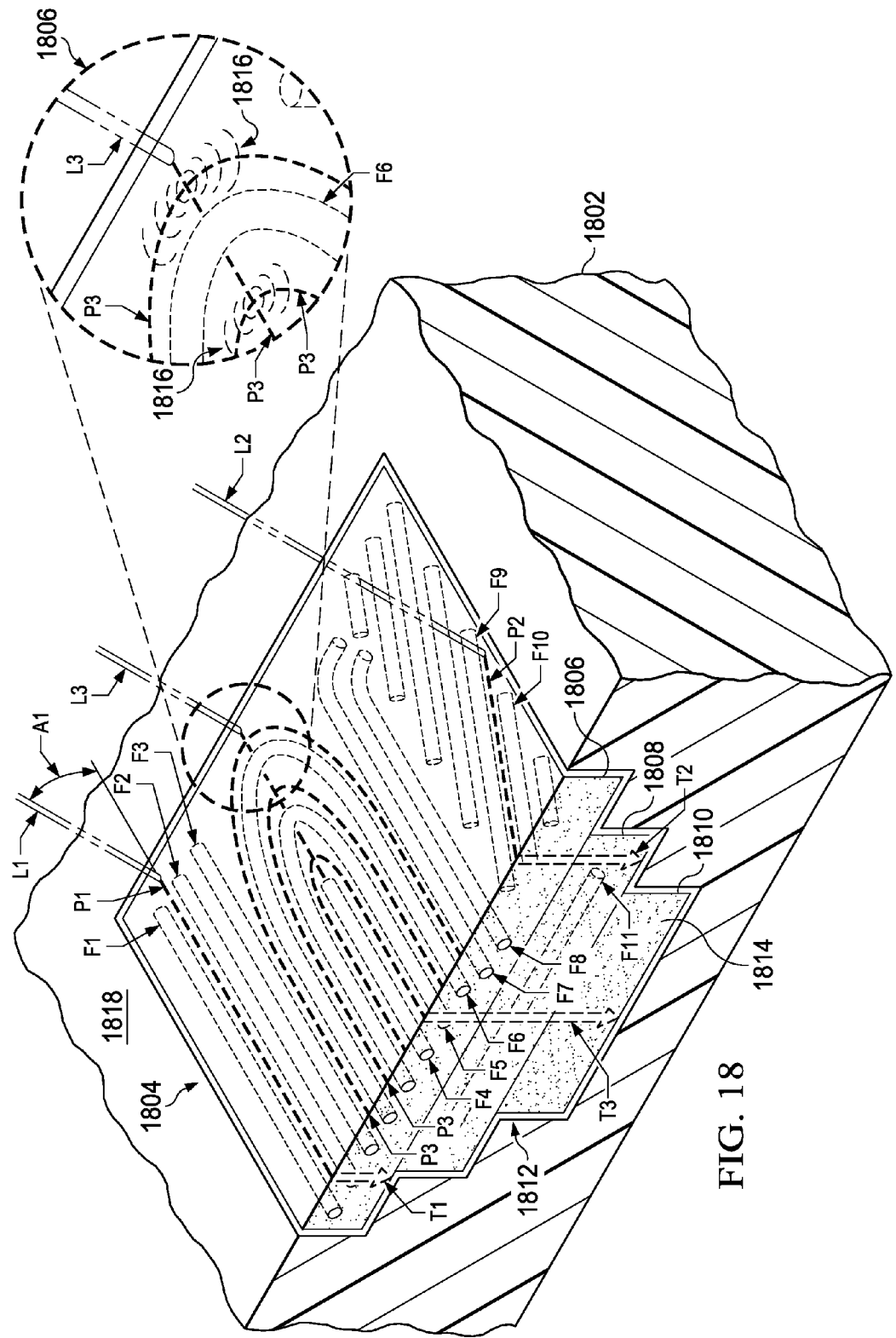
FIG. 18 is an illustration of a cross-sectional view of a composite patch in a rework area in accordance with an advantageous embodiment.

With reference now to FIG. 18, FIG. 18 is an illustration of a cross-sectional view of a composite patch in a rework area in accordance with an advantageous embodiment. Specifically, FIG. 18 shows a rework area that includes structure composite structure 1802 receiving composite patch 1804. Composite structure 1802 may be an example of an illustrative embodiment of composite structure 204, as shown at least in FIG. 2.

Composite patch 1804 may have layers of composite material, such as shown at least as layers of composite material 218 in FIG. 2. For illustrative simplification, composite patch 1804 is shown in FIG. 18 with three layers, layer 1806, layer 1808, and layer 1810. Without limitation, number of layers of composite material 218 may include any quantity of layers as may be necessary depending on the particular features of composite structure 1802 and the rework area. Each of layer 1806, layer 1808, and layer 1810 may include fibers, such as without limitation fiber F1 through fiber F11, as shown at least in FIG. 18.

Fibers in each layer of composite material 218 may be of any quantity and orientation as dictated by a desired characteristic for each layer in composite material 218, and/or for composite patch 1804 as a whole. As an example, in the illustrative embodiment of FIG. 18, layer 1806 may contain fiber F1-fiber F10. Fiber F1-fiber F4 may be substantially parallel to each other, fiber F5 and fiber F6 may arch around fiber F4, fiber F7 and fiber F8 may partially align with a portion of fiber F6 and a portion of fiber F11, fiber F9-fiber F10 may be substantially parallel to each other, but angled relative to portions of fiber F1-fiber F8. Thus, layer 1806 may be considered as having four sections, each section generally defined by a particular fiber orientation.

Likewise, layer 1806 may contain resin. In FIG. 18, a single resin, resin 1814, represented in FIG. 18 by speckled dots within composite material 218, may be used for each layer of composite material 218. Without limitation each layer may use a resin that may be distinct from a resin used in any one of or all other layers. Likewise, any section within any of composite material 218 may have a resin that may be unique from a resin that might be used in another section of composite patch 1804. As a non-limiting example, each layer of composite material 218 may have a unique resin, and/or each section of any layer that may have different fiber orientations, such as without limitation shown in layer 1806, may use a different resin.

Layer 1808 may contain fibers of similar quantity and/or patterns as found in layer 1806, or quantity and/or patterns that may be different from those in layer 1806 and/or layer 1810. For illustrative simplification, FIBER F11 is shown as a single fiber that may be oriented, without limitation, substantially perpendicular to the orientation of fiber F4. For illustrative simplification, layer 1810 is shown without any fibers.

Without limitation, controller 226, as shown in FIG. 2, which may be embodied by controller 822 shown at least in FIG. 8, may be provided and/or possess data about location, a composition, and a characteristic for each fiber and each resin used in composite patch 1804. Without limitation, controller 226, may be provided and/or possess data about location, a composition, and a characteristic for each fiber and each resin used in composite structure 1802. Without limitation, controller 226, may be provided and/or possess data about location, a composition, and a characteristic for alignment and interaction between each fiber and/or resin in composite structure 1802 with each fiber and/or resin in composite patch 1804. Without limitation, using any and/or all of the data about composite structure 1802 and/or composite patch 1804, controller 822 may compute a desired quantity and rate of heat transfer from layer 1806 down and/or through layer 1806, as indicated in FIG. 18 by T1 to determine how much energy needs to be added to layer 1806, and precisely where to add that energy, to raise layer 1806 to a temperature desired to impart a desired characteristic into layer 1806, such as without limitation a cured state for layer 1806, without degrading any desired characteristic for any fiber within layer 1806.

Likewise, controller 822 may compute a quantity and rate of heat transfer from layer 1806 down and/or through layer 1808, as indicated in FIG. 18 by T2 to determine how much energy needs to be added to layer 1806, and precisely where to add that energy, to raise layer 1806 to a temperature desired for curing layer 1806 without damaging any fibers within layer 1806 and to transfer heat from layer 1806 down into and/or through layer 1808 to raise layer 1808 to a temperature desired for curing layer 1808 without damaging any fibers within layer 1808. Likewise, controller 822 may compute a quantity and rate of heat transfer from layer 1806 down and/or through layer 1806 and layer 1808 into layer 1810, as indicated in FIG. 18 by T3 to determine how much energy needs to be added to layer 1806, and precisely where to add that energy, to raise layer 1806 and layer 1808 to a temperature desired for curing layer 1806, layer 1808, and layer 1810 without damaging any fibers within any of the layers.

Composite patch 1804 may abut against composite structure 1802. FIG. 18 shows composite patch 1804 as having three stepped layers of composite plies in and abutting scarf 1812 of composite structure 1802, as one example of an embodiment for composite patch 216 and scarf 214 in composite structure 204, as shown at least in FIG. 2. Composite patch 1804 may have other numbers of layers, and may have a shape other than stepped, and may be compatibly fitted into sections of composite structure 1802 that may be prepared to receive composite patch 1804 in a shape or manner other than the stepped shape shown for scarf 1812 in FIG. 18. Without limitation, composite patch 1804 may have tapered sides and may have layers with a constant or a varied taper angle.

Accordingly, controller 822 may be configured to receive and process data about composite structure 1802 in contact with composite patch 1804 and command a laser beam, such as without limitation, laser beam L1, laser beam L2, and/or laser beam L3, such that resin 1814 in composite patch 1804 may be raised to a temperature that allows composite patch 1804 to cure, while controller 822 prevents an excessive temperature in composite structure 1802. An excessive temperature in composite structure 1802 may be any temperature high enough to reduce a desired property of composite structure 1802.

Composite structure 1802 may be made from layers of composite plies that may contain fibers and cured resins. Energy applied into layer 1806 may transfer heat into composite structure 1802 via abutment with composite patch 1804. Controller 822 may also be provided and/or possess the location and characteristics of all the components of composite structure 1802 that adjoin and/or abut composite patch 1804.

Thus, controller 822 may also compute the energy needed to achieve desired curing and/or other characteristics for composite patch 1804 without overheating components of composite structure 1802. Overheating a component of composite structure 1802 would be raising a temperature of a component of composite structure 1802 such that after curing composite patch 1804, on and/or into composite structure 1802, a component of composite structure 1802 would not have a desired characteristic or performance. Without limitation, a desired characteristic and/or performance of a component of composite structure 1802 may be that composite structure 1802 bonds to composite patch 1804 after composite patch 1804 is cured on and/or into composite structure 1802 such that loads in composite structure 1802 are transferred through composite patch 1804 such that no loads are effectively carried and/or transferred through the rework area without any further development of an inconsistency in the rework area.

Energy applied to layer 1806 may come from laser unit 224, as shown at least in FIGS. 2 and 4 (embodied at least as laser unit 112 in FIG. 8), and may be generated from laser source 400, as shown in FIG. 4 (embodied at least as 818 in FIG. 8), with a particular wavelength and/or intensity, and/or for a duration, determined by controller 822. Mirror 812, mirror 814, and scanning lens 816, as shown at least in FIG. 8, may be adjusted by commands from controller 822 to precisely aim a particular laser beam, such as without limitation laser beam L1, laser beam L2, and/or laser beam L3, onto a precise location on composite patch 1804.

Laser unit 112, as shown at least in FIG. 1, may direct several different laser beams onto composite patch 1804, or may alter a wavelength and intensity of a single laser beam as it is directed onto selected locations on composite patch 1804. For illustrative simplification, FIG. 18 shows three laser beams, laser beam L1, laser beam L2, and laser beam L3 directed into layer 1806 of composite patch 1804. Laser beam L1, laser beam L2, and/or laser beam L3 may be indicative of any number of laser beams that may be commanded by controller 822 and directed onto layer 1806 of composite patch 1804. Laser beam L1, laser beam L2, and/or laser beam L3 may be commanded by controller 822 and directed onto layer 1806 of composite patch 1804 either simultaneously, or at different times. Laser beam L1, laser beam L2, and/or laser beam L3 may be commanded by controller 822 and directed onto layer 1806 of composite patch 1804 to raise the temperature of layer 1806 to a desired level without damaging any fibers in composite patch 1804.

Laser beam L1, laser beam L2, and/or laser beam L3 may also be viewed as a representation of a single laser beam transmitted at three different times onto three different sections of composite patch 1804, possibly using a different wavelength, duration, and/or intensity, at the different times. A quantity of number of laser beams 236, as shown at least in FIG. 2, and/or of variations in any single laser beam, may be greater than or less than the three indicated in FIG. 18 by laser beam L1, laser beam L2, and laser beam L3.

The expanded area around laser beam L3 shown by enlargement layer 1806 in FIG. 18 indicates scanning lens 816 (not shown in FIG. 18, but seen in FIG. 8) directing energy 1816 via laser beam L3 into layer 1806 along path P3 (shown by heavy dotted lines). Laser beam L3 stops directing energy into layer 1806 when laser beam L3 approaches an edge of fiber F6, and transmits again beyond an opposite edge of fiber F6 Likewise, controller 822 directs laser beam L3 to transmit along path P3 so that energy is directed around, but not into fiber F4, fiber F5, and fiber F6.

Similarly, laser beam L2 is shown moving in layer 1806 along path P2 between fiber F9 and fiber F10. Laser beam L1 is shown moving in layer 1806 along path P1 between fiber F1 and fiber F2. Hence, without limitation, FIG. 18 gives three examples of how laser beam 118, as shown at least in FIG. 1 and FIG. 8, may be directed into layer 1806 without directly heating any fiber elements within layer 1806. As necessary, along any path, such as without limitation path P1, path P2, or path P3, a wavelength and/or an intensity of a laser beam, represented without limitation by laser beam L1, laser beam L2, and laser beam L3, may be altered as necessary by commands from controller 822 to laser source 818, and/or laser unit 112, and/or scanning lens 816, as shown at least in FIG. 8.

As noted above, before laser beam 118 is directed into layer 1806, analysis 618, as shown at least in FIG. 6, provides a basis for a plan for commands 238 that may direct a location, a wavelength in number of wavelengths 616, intensity 614, and time 612, or duration, for laser beam 118 to contact layer 1806 to heat composite patch 1804 to complete composite rework on composite structure 1802. The plan for commands 238 may be based on empirical data 626, as shown at least in FIG. 6. Intensity 614 may be controlled by use of a neutral density filter (not shown). The neutral density filter may be a part of laser unit 112, as shown at least in FIG. 1 and FIG. 8, or as laser unit 224 as shown at least in FIG. 2. Laser unit 112 may also have associated a polarization filter (not shown) that may help generate particular polarization for each wavelength of number of parameters 608 produced. The polarization filter may be a part of laser unit 112, as shown at least in FIG. 1 and FIG. 8, or as laser unit 224 as shown at least in FIG. 2. Energy directed into layer 1806 may also be controlled by controlling an angle of incidence between laser beam 118 and surface 1818 of composite patch 1804, as shown without limitation by angle of incidence A1 between laser beam L1 and surface 1818. Laser beam 118 may control by angle of incidence A1. Laser beam 118 may control by angle of incidence A1 via controlling scanning lens 816.

An actual performance of laser beam 118 may be continuously evaluated against empirical data 626 based upon inputs to controller 822 from sensor system 228, as shown at least in FIG. 2 and FIG. 5. Sensor system 228 may include infrared camera 808 and visible camera 810, as shown at least in FIG. 8.

Visible camera 810 may determine an actual boundary of composite patch 1804 as placed on composite structure 1802. Visible camera 810 may determine an actual alignment of composite patch with composite structure 1802 after composite patch 1804 is placed on and/or in composite structure 1802.

Visible camera 810 may determine an actual location of each fiber in layer 1806 once placed on and/or in composite structure 1802. Thus, visible camera 810 may serve to help orient and validate, without limitation, results 624, empirical data 626, commands 238, area 620, parameters 608, and/or combinations thereof, as shown at least in FIG. 6, for controller 822. As a non-limiting example, if any fiber in composite patch 1804 were not set into the resin of one of layers of composite material 218 in accordance with the rework information 606, as shown at least in FIG. 6, provided for composite patch 1804 to controller 822, then an image sensed by visible camera 810 may be used to update commands 238 from controller 822 to laser unit 112 and components associated therewith. An update to commands 238 may include new guidance for beam steering system 402 of laser unit 224, as shown at least in FIG. 4. Thus, controller 882 may issue commands 238 to beam steering system 402, which may include scanning lens 816, to redirect laser beam 118 so as not to direct energy as laser light directly into a fiber that sensor system 228 recognizes may be set into resin 1814 at a location that does not correspond to the location indicated, by the rework information 606, for the fiber. Updates to commands 238 may be based on a comparison between information and/or data 242, sensed by sensor system 228, as shown at least in FIG. 2, about composite structure 1802 and/or composite patch 1804, and results 624, empirical data 626, rework information 606, and/or any combinations thereof. Comparison may be performed by controller 226. Controller may use rework module 604 to perform comparison.

Visible camera 810 may also serve to determine a transparency of resin in composite patch 1804. As resin changes temperature and/or cures the transparency of the resin may change. A change in the transparency of the resin may change the parameters 608 and analysis 618, at least as shown in FIG. 6, that controller 822 may use to determine commands 238 from controller 822 to laser unit 112 and components associated therewith. In other words, as transparency of resin changes, a change in wavelength, intensity, duration, angle of incidence A1, and/or combination thereof for laser beam 118 may be commanded by controller 822.

Similarly, infrared camera 808, as shown at least in FIG. 8, may provide thermal imaging and temperature information for various portions of composite patch 1804 and/or composite structure 1802. Infrared camera 808 may provide a monitor of actual heating of each fiber and each section of resin in each layer of composite patch 1804. Thus, infrared camera 808 may validate and/or update without limitation results 624, empirical data 626, commands 238, area 620, parameters 608, and/or combinations thereof, as shown at least in FIG. 6, for controller 822. In other words, by monitoring actual temperature of resin and/or fiber temperatures in composite patch 1804, controller can adjust laser beam 118 to control a temperature of each section of resin to remain at a value that produces a desired rate of and/or properties of curing the resin. Precise control of resin temperature, without overheating of fibers in the resin may result in rework system 220, as shown at least in FIG. 2, allowing for curing composite patch 1804 in place in composite structure 1802 at a curing rate that may be faster, and/or with less damage to fibers, than that capable without using rework system 220.

In other words, illustrative embodiments herein describe the novel features and benefits of the proposed invention over the current methods of heating a composite rework. Illustrative embodiments herein show a laser heating method and system designed for composite repair curing. Producing a laser beam 118 that targets only the repair area 620, as shown at least in FIG. 6, may allow reliable easy repairs in areas hard to access or those that must be applied somewhat remotely, for example through small access holes.

Thus, laser light can be used to provide controlled heating by tuning the wavelength of the light to maximize the resin prepreg energy absorption of the composite repair area. In a manner similar to the specific selection of energy provided by laser beam 118 herein, so to a group of high power light emitting diodes (LEDs) may be used as an alternative to laser unit 224, as shown at least in FIG. 2, described herein to direct precise amounts of energy to precise locations as determined and controlled as described herein by controller 822, as shown at least in FIG. 8. Hence, descriptions herein for a laser source, such as without limitation laser source 400 as shown at least in FIG. 4, or a laser beam, such as without limitation laser beam 118 as shown at least in FIG. 1 and/or FIG. 8, may be representative of and applied to any beam of light that be precisely controlled to heat specific portions of composite patch 1804. Without limitation the beam of light directed onto composite patch 1804 by commands 238 from controller 226, as shown at least in Figure in FIG. 6, may be a beam of light from a light emitting diode and/or an array of light emitting diodes.

Likewise, descriptions herein for the controller providing commands 238 directing beam steering system 402, as shown at least in FIG. 4, or as embodied by scanning lens 816, as shown at least in FIG. 8, may be representative of and applied as commands to any beam steering system that guides any light beam of sufficient energy and precision to heat a specified portion of composite patch 1804 without overheating an adjacent structure, or a fiber, such as without limitation fiber F1 and/or fiber F11 as shown at least in FIG. 18, within composite patch 1804.

Likewise descriptions herein for number of wavelengths 404, shown as being produced by laser source 400, as shown at least in FIG. 4, may be representative of and applied to wavelengths that be directed of any light beam directed by commands 238 from controller 226, as shown at least in FIG. 6.

In addition, laser beam 118 can be controlled and directed based on feedback sensed by infrared camera 808 and visible camera 810, as shown at least in FIG. 8, to identify specific fiber locations and orientations within layers of composite material 218 in area 620 that makes up composite patch 216 during curing. By controller 226 selecting a particular wavelength frequency based on an absorption characteristic of the surface and/or coating and/or resin of composite patch 1804, an amount of energy used for curing can be precisely controlled for composite curing layers of composite material 218 that form composite patch 1804. An intensity, and/or an angle of incidence, and/or a polarization, which controller 822 commands for laser beam 118, can be used in conjunction with selected fiber orientations and/or locations in composite patch 1804 to achieve a curing time and/or technique that may provide a composite rework with more desired characteristics in less time and for less cost than may be currently achieved using methods and systems not described herein.

Data 242, as shown at least in FIG. 6, sensed from infrared camera 808 may provide an accurate internal temperature for curing composite patch 1804. The accurate internal temperature can be used to compare to empirical data 626 that may form a pre-determined finite element model that may be produced by finite element analysis 621 as a part of analysis 618, as shown at least in FIG. 6.

In other words, a lookup table from the finite element model can be used to control the laser intensity by optimizing a neutral density filter, a polarization filter, an illumination duration, an incidence angle, a wavelength, and/or a power supply current for laser beam 118. Thus, a laser curing control method, as described for embodiments herein, may provide exact controls to optimize curing composite patch 1804 without damaging a fiber, other components, a pre-cured area in composite patch 1804, and/or any combination thereof that may be present in composite patch 1804. The selection of laser light wavelength, power, optical density, and/or composite fiber orientation and/or heating cycle may be determined by pre-defined finite element thermal analysis and modeling, such as without limitation rework module 604 as shown at least in FIG. 6.

A thermal analysis, such as without limitation analysis 618 and/or rework module 604 as shown at least in FIG. 6, may model each step of the cure process. Analysis 618 and/or rework module 604 may optimize the parameters. Parameters may be optimized by defining variables for each stage of processing, thereby ensuring minimal ply and lamination issues and minimizing thermally induced stress and deformations. A wavelength for laser beam 118 may be determined based upon several factors that may include without limitation: a vacuum bag transparency, a vacuum bag reflectivity, an optical absorption of resin material in composite patch 1804, a depth of repair in composite structure 1802, a number of carbon plies in composite patch 1804, and/or composite structure 1802, and/or a combination thereof.

Analysis 618 and/or rework module 604 may include thermal modeling. Thermal modeling may be used to define input parameters prior to manufacturing composite patch 1804. Thermal modeling may be used in conjunction with a real-time thermal map and embedded thermal strain sensors (see FIG. 6). Thereby, illustrative embodiments herein show a real-time non-destructive examination (NDE) technique to monitor any repair defects occurring during manufacturing, and provide a cost saving opportunity to re-work or repair composite structure 1802 before further manufacturing or touch-time costs are incurred (see FIG. 5).

Figure 19:
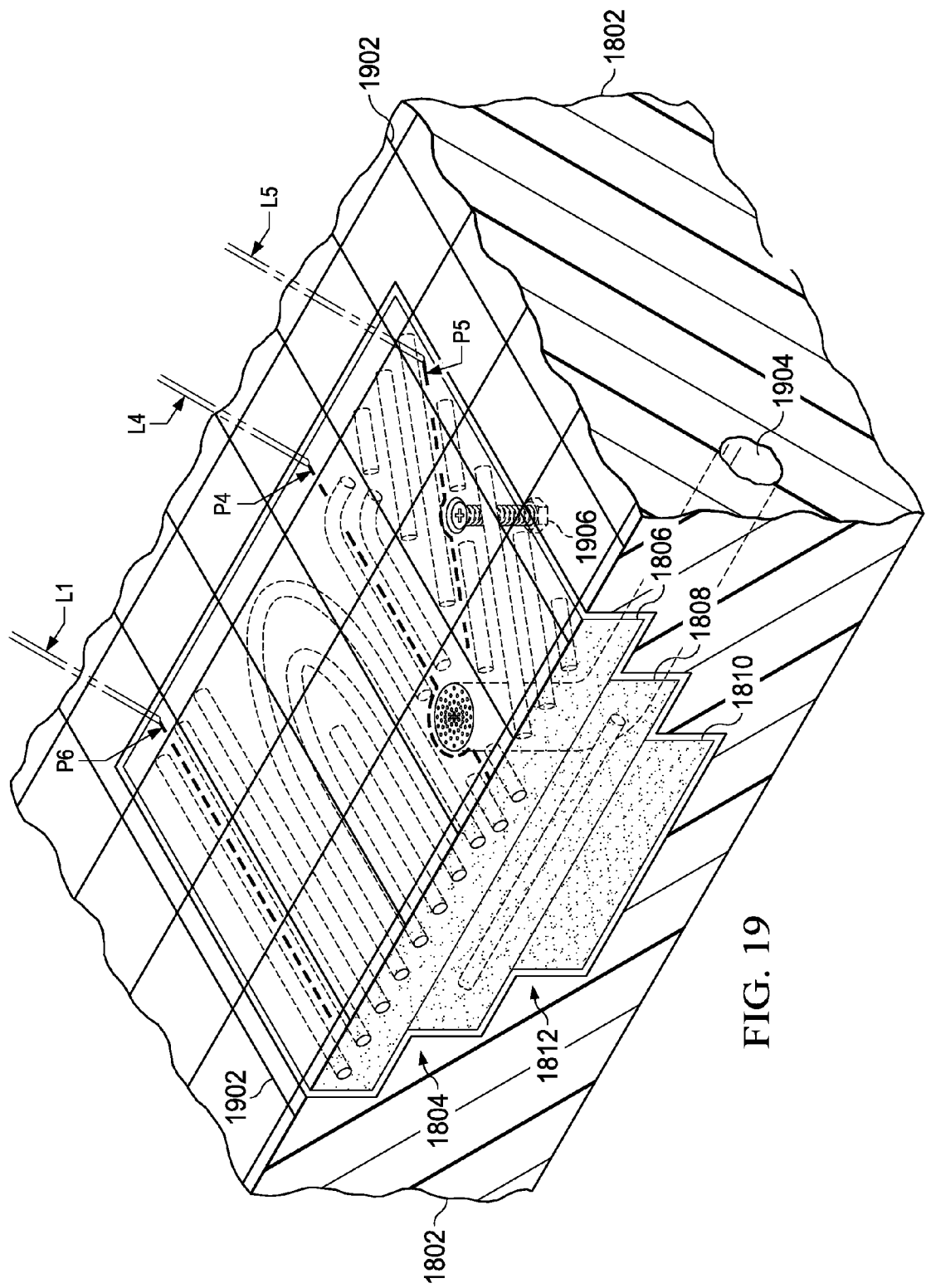
FIG. 19 is an illustration of a cross-sectional view of a composite patch in a rework area in accordance with an advantageous embodiment.

Referring now to FIG. 19, FIG. 19 is an illustration of a cross-sectional view of a composite patch in a rework area in accordance with an advantageous embodiment. FIG. 19 adds three new features to composite patch 1804, not shown in FIG. 18, thus, except for newly added features, all items in FIG. 19 retain their item identifications presented in FIG. 18. Specifically, FIG. 19 adds mesh 1902, port 1904, and fastener 1906.

Mesh 1902, port 1904, and fastener 1906 are added to FIG. 19 to illustrate some non-limiting examples of features that may be added into composite patch 1804. Without limitation, mesh 1902 may be any material added into a layer of composite patch 1804 that may provide for composite patch 1804, and/or connect with a substance or manner in composite structure 1802 of providing dissipation and/or distribution of electrical current in and/or through composite patch 1804. Without limitation, port 1904 may represent any type of equipment that may be in composite patch 1804 that may associate with some system in composite structure 1802. Without limitation, fastener 1906 may represent any type of material that may connect composite patch 1804 to composite structure 1802, or pass through composite patch 1804 to connect composite structure 1802 to some other object.

Laser beam L4 and laser beam L5, as shown in FIG. 18, may be considered representations of laser beam L1 and laser beam L2 respectively, at a time when laser beam L1 and laser beam L2 are illuminating different particular parts of composite patch 1804 then they are shown illuminating in FIG. 18. Likewise, laser beam L1, laser beam L4, and laser beam L5 may be viewed as representations of single laser beam, such as, without limitation, laser beam 118 as shown at least in FIG. 8, illuminating different portions of composite patch 1804 at different times.

As shown in FIG. 19, controller 822 may command beam steering system 402, as shown at least in FIG. 4, to direct laser beam L1, laser beam L4, and/or laser beam L5 along respective paths path P1, path P4, and path P5 to add energy into layer 1806 such that none of mesh 1902, port 1904, and/or fastener 1906 are heated beyond a desired temperature. The desired temperature may be one that precludes any diminishment in an operational capacity and/or structural integrity of mesh 1902, port 1904, and/or fastener 1906, and/or any parts of composite patch 1804 or composite structure 1802 that associate with mesh 1902, port 1904, and/or fastener 1906.

Hence for example as laser beam L1 moves along path P6, laser beam L1 may stop transmission near, or skip over any part of mesh 1902 in composite patch 1804. Similarly, laser beam L4 moving along path P4 may also skip over any part of mesh 1902 in composite patch 1804 and may also be steered to curve around port 1904 without directing energy into port 1904. Similarly, laser beam L5 moving along path P5 may also be steered skip over any part of mesh 1902 in composite patch 1804 and to curve around fastener 1906 without directing energy into fastener 1906. As shown in FIG. 19, laser beam L1, laser beam L4, and laser beam L5, may respectively be directed along path P1, path P4, and path P5 such that no energy from any of laser beam L1, laser beam L4, and laser beam L5, may be steered directly onto any fiber within composite patch 1804.

Figure 20:
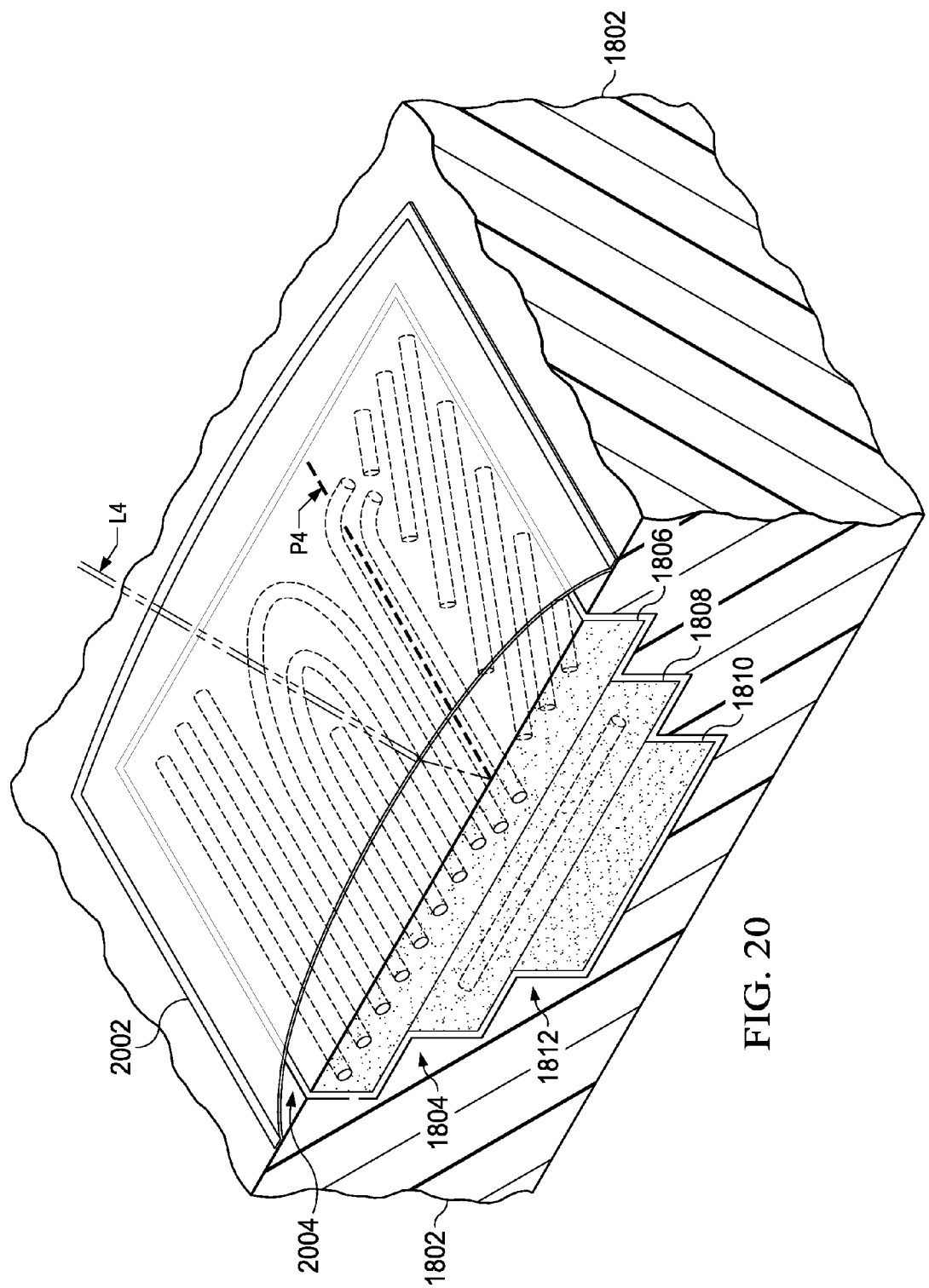
FIG. 20 is an illustration of a cross-sectional view of a vacuum bag covering a composite patch in a rework area in accordance with an advantageous embodiment.

Referring now to FIG. 20, FIG. 20 is an illustration of a cross-sectional view of a vacuum bag covering a composite patch in a rework area in accordance with an advantageous embodiment. FIG. 20 adds two new features not shown in FIG. 18, thus, except for newly added features, all items in FIG. 20 retain their item identifications presented in FIG. 18. Specifically, FIG. 20 adds vacuum bag 2002 and vacuum space 2004. Vacuum bag 2002 may form vacuum space 2004 over composite patch 1804.

Vacuum bag 2002 may have a particular characteristic for absorption, reflection, refraction, diffraction of light energy of a laser beam at each particular wavelength of the laser beam. Vacuum bag 2002 may have an anti-reflection coating. Thus, vacuum bag 2002 may absorb, reflect, pass through, and/or combinations thereof, some of an energy and/or light from laser beam L4. Thus, light from a laser beam passing through vacuum bag 2002, such as, without limitation, laser beam L4, may be altered before it reaches composite patch 1804. Without limitation, an intensity, a polarization, a wavelength, and/or a direction of any laser beam, such as, without limitation, laser beam L4, may be altered before reaching composite patch 1804.

Likewise, when air may be removed from vacuum bag 2002 to form vacuum space 2004, vacuum space 2004 may alter an intensity, a polarization, a wavelength, and/or a direction of any laser beam, such as, without limitation, laser beam L4, as it passes through vacuum space 2004, before the laser beam reaches composite patch 1804 and forms path P4.

Without limitation, data, characteristics, and/or properties about vacuum bag 2002 and/or vacuum space 2004 may be provided to controller 822, as shown at least in FIG. 8. Controller 822 may use any of data, characteristics, and/or properties about vacuum bag 2002 and/or vacuum space 2004 to determine commands 238, as shown at least in FIG. 6, to laser beam L4.

Similarly, thermal and visual readings of sensor system 228 may be affected by data, characteristics, and/or properties of vacuum bag 2002 and/or vacuum space 2004. Controller 822 may use known data, characteristics, and/or properties about vacuum bag 2002 and/or vacuum space 2004 to accurately interpret actual position, boundary, and/or conditions of composite patch 1804 and composite structure 1802 within vacuum bag 2002.

Figure 21:
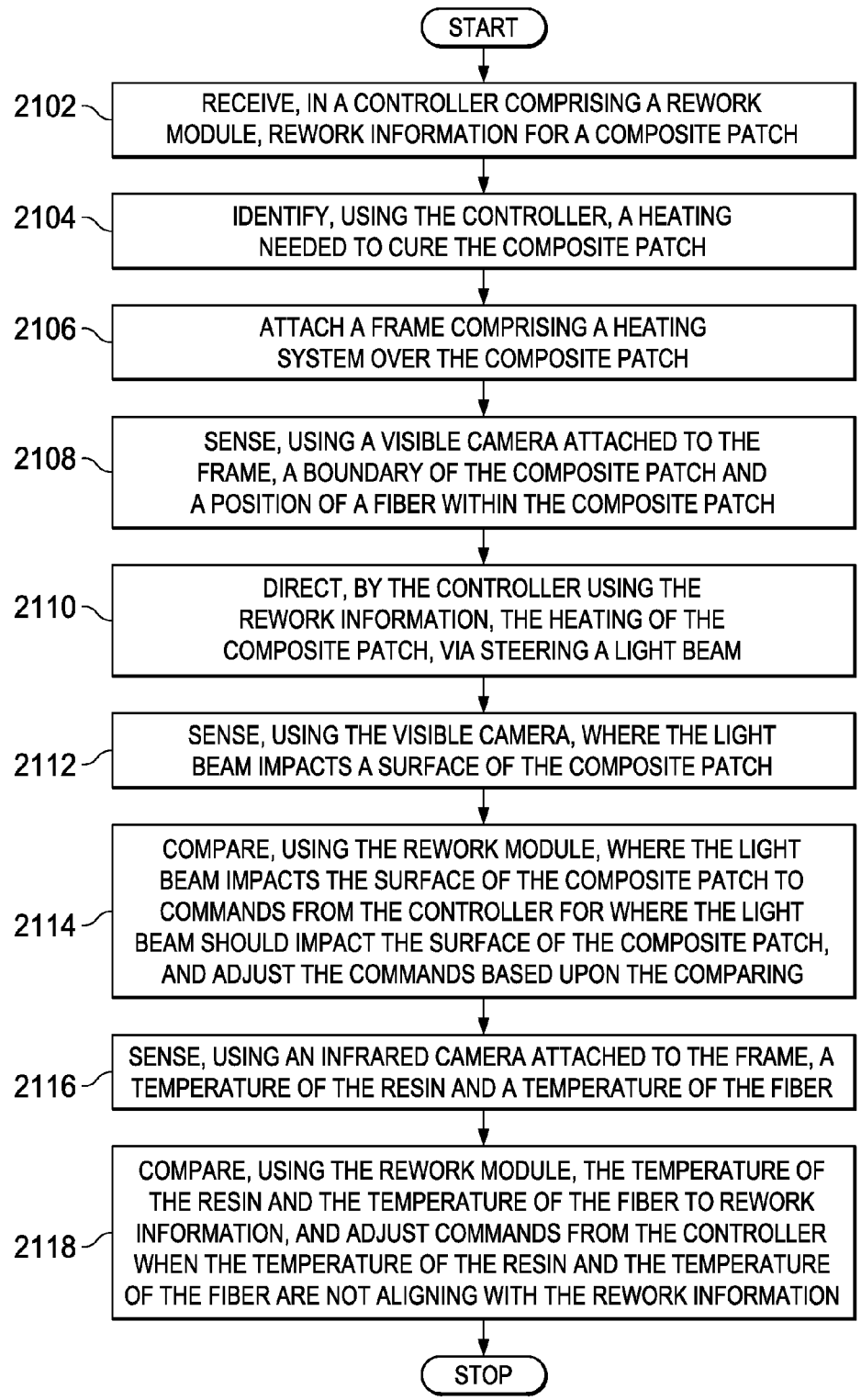
FIG. 21 is an illustration of a flowchart of a process for preventing overheating a fiber in a composite patch while curing the composite patch in accordance with an advantageous embodiment.

With reference now to FIG. 21, FIG. 21 is an illustration of a flowchart of a process for preventing overheating a fiber in a composite patch while curing the composite patch in accordance with an advantageous embodiment. More specifically, the process may begin by receiving, in a controller comprising a rework module, rework information for a composite patch (operation 2102).

Process 2100 may include identifying, using the controller, a heating needed to cure the composite patch (operation 2104). Process 2100 may include attaching a frame comprising a heating system over the composite patch (operation 2106). The composite patch may be in a scarf in a composite structure when attaching the frame over the composite patch. The composite patch may include layers of composite material and a resin, and the rework information may include: a location of an area occupied by the composite patch, and a location, and a parameter for the fiber and the resin in each layer of the composite patch.

The heating system may include a light beam. The heating system may include a laser unit. The laser unit may include a laser source. The rework module may use the rework information for generating commands for the heating system.

Process 2100 may include sensing, using a visible camera attached to the frame, a boundary of the composite patch and a position of a fiber within the composite patch. (operation 2108).

Process 2100 may include directing, by the controller using the rework information, the heating of the composite patch, via steering a light beam (operation 2110). The controller may direct the heating system via commands directing a light beam into a resin of the composite patch while avoiding directing the light beam directly onto a fiber in the composite patch.

The light beam may be a laser beam from a laser unit, such as without limitation laser unit 224 as shown at least in FIG. 2, or in place of laser unit 224, without limitation from a light emitting diode. The light beam may include a wavelength, an intensity, a polarization, an angle of incidence, and a duration directed at the resin of the composite patch, and/or a combination thereof, adhering to commands from the controller.

Process 2100 may include sensing, using the visible camera, where the light beam impacts a surface of the composite patch (operation 2112). Process 2100 may include the rework module comparing where the light beam should impact the surface of the composite patch to commands from the controller for where the light beam should impact the surface of the composite patch, and adjusting the commands based upon the comparing (operation 2114).

Process 2100 may include sensing, using an infrared camera attached to the frame, a temperature of the resin and a temperature of the fiber (operation 2116). Process 2100 may include the rework module comparing the temperature of the resin and the temperature of the fiber to rework information, and adjusting commands from the controller when the temperature of the resin and the temperature of the fiber are not aligning with the rework information (operation 2118). Adjusting the commands from the controller when the temperature of the resin and the temperature of the fiber are not aligning with the rework information may include changing a characteristic of the light beam. Changing a characteristic of the light beam may include: changing a least one of: a direction, a wavelength, an intensity, a polarization, and angle of incidence, and a duration, for the light beam entering into the resin. Changing a direction of the light beam may include the controller sending commands to a beam steering system. Process 2100 may be complete when composite patch 1804 may be fully cured.

Thus, using illustrative embodiments shown herein for an apparatus and method for rework system 220, as shown at least in FIG. 2, may provide a mechanical repair process that may eliminate a somewhat unknown thermal distribution in current composite repair curing procedures, and eliminate guesswork associated with what localized heating is needed to produce a repeatable repair. Thus, illustrative embodiments herein show a system and method of heating a composite rework that is more cost effective, accurate, and reliable than current systems that do not use the rework system and method described herein.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated. Further, the limitations of the following claims are not written in means-plus-function format and are not intended to be interpreted based on 35 U.S.C. § 112(f) unless and until such claim limitations expressly use the phrase "means for" followed by a statement of function void of further structure.

What is claimed is:

1. A machine for heating a composite patch, the machine that comprises:
   a laser unit that comprises a beam steering device; and
   a controller that comprises:
      a rework module that comprises: data for a location, a composition, and a characteristic of a fiber within a resin in a layer in the composite patch; and
      commands for the beam steering device such that the commands comprise directions for a path of a laser beam on a surface of the composite patch and around the fiber while the laser beam heats the resin to a cure temperature, such that the commands prevent the fiber from reaching a temperature that would cause a loss of a desired characteristic or performance, for the composite patch, of the fiber after curing the composite patch.

2. The machine of claim 1 further comprising:
   the directions being based upon at least one of: a simulation, or a modeling of heating of components and layers within the composite patch;
   the laser unit directly connected to a frame; and
   an attachment system configured to attach the frame to a location over the composite patch on a composite structure.

3. The machine of claim 1, further comprising:
   a sensor system configured to detect a temperature of a component within the composite patch and generate temperature data, and connected to the rework module that comprises a special program that operates, based on the temperature data for each section and the composite patch generated by the sensor system, the laser unit to generate a number of laser beams that result in a level of heating of the composite patch that cures the composite patch.

4. The machine of claim 1, wherein the laser unit comprises a laser source that comprises the laser beam that comprises: a wavelength, an intensity, and an angle of incidence to the surface of the composite patch, and the controller comprises further commands to control: the wavelength, the intensity, and the angle of incidence to the surface of the composite patch, for a duration that raises a desired section of the composite patch to the cure temperature.

5. The machine of claim 4, wherein the wavelength increases an absorption of light from the laser beam by the composite patch via a command to produce a desired color or transparency of the resin.

6. The machine of claim 1, the commands further comprise directions for the beam steering device to move a number of laser beams over the surface of the composite patch in a manner that results in a desired level of heating of the composite patch without a reduction of the desired characteristic of the fiber.

7. The machine of claim 1, further comprising:
the rework module comprising:
a program that receives and processes information about a composite structure in contact with the composite patch; and
commands for the laser beam that raise the resin to cure temperature and prevent an excessive temperature in the composite structure.

8. The machine of claim 1, further comprising:
a sensor system connected to the rework module and configured to transfer data about the composite patch to the rework module, such that the commands comprise an area that the laser beam is to be directed to, based upon the data and rework information.

9. A process for heating a composite patch while curing the composite patch, the process comprising:
receiving, in a controller comprising a rework module, rework information comprising data for a location, a composition, and a characteristic of a fiber within a resin in a layer in the composite patch;
identifying, using the controller, a heating of the composite patch needed to cure the composite patch;
attaching a frame comprising a heating system over the composite patch;
sensing, using a visible camera attached to the frame, a boundary of the composite patch and a position of the fiber;
directing, by the controller using the rework information, the heating of the composite patch, via steering a light beam;
sensing, using the visible camera, where the light beam impacts a surface of the composite patch;
the rework module comparing where the light beam impacts the surface of the composite patch to commands from the controller for where the light beam should impact the surface of the composite patch, and adjusting the commands based upon the comparing;
sensing, using an infrared camera attached to the frame, a temperature of the resin and a temperature of the fiber in the composite patch; and
the rework module comparing the temperature of the resin and the temperature of the fiber to rework information, and preventing the fiber from reaching a temperature that would cause a loss of a desired characteristic or performance, for the composite patch, of the fiber after curing the composite patch via responding, to the temperature of the resin and the temperature of the fiber misaligning from the rework information, via adjusting commands from the controller.

10. The process of claim 9, further comprising the composite patch comprising layers of composite material and the resin, and the rework information comprising: a location of an area occupied by the composite patch, and a location and a parameter for the fiber and the resin in each layer of the composite patch.

11. The process of claim 9, further comprising:
basing the commands upon at least one of: a simulation, or a modeling of heating of components and layers within the composite patch; and
the heating system comprising a laser unit comprising a laser source.

12. The process of claim 9, further comprising the composite patch being in a scarf in a composite structure when attaching the frame over the composite patch.

13. The process of claim 9, further comprising:
the controller directing the heating system via directing the light beam into the resin of the composite patch while avoiding directing the light beam directly onto the fiber; and
the controller comprising further commands to control: a wavelength, an intensity, and an angle of incidence to the surface of the composite patch, of the light beam.

14. The process of claim 13, further comprising the light beam being from a light emitting diode.

15. The process of claim 13, further comprising a laser unit comprising a laser beam.

16. The process of claim 15, further comprising the laser beam comprising the wavelength, the intensity, a polarization, the angle of incidence, and a duration directed at the resin of the composite patch, and/or a combination thereof, adhering to commands from the controller.

17. The process of claim 9, further comprising the rework module using the rework information for generating commands for the heating system.

18. The process of claim 9, further comprising the adjusting commands from the controller when the temperature of the resin and the temperature of the fiber are not aligning with the rework information, comprising changing a characteristic of the light beam.

19. The process of claim 18, further comprising changing a characteristic of the light beam comprising: changing a least one of: a direction, a wavelength, an intensity, a polarization, and angle of incidence, and a duration, for the light beam entering into the resin.

20. The process of claim 19, further comprising changing the direction of the light beam comprising the controller sending commands to a beam steering system.

* * * * *